United States Patent [19]

Bohrer

[11] Patent Number: 4,478,076

[45] Date of Patent: Oct. 23, 1984

[54] FLOW SENSOR
[75] Inventor: Philip J. Bohrer, Minneapolis, Minn.
[73] Assignee: Honeywell, Inc., Minneapolis, Minn.
[21] Appl. No.: 431,537
[22] Filed: Sep. 30, 1982
[51] Int. Cl.³ .............................................. G01F 1/68
[52] U.S. Cl. ........................................................ 73/204
[58] Field of Search .................... 73/204; 338/22.5 S, 338/22.5 D, 25, 292, 293, 308, 309, 319; 357/28, 55, 82

[56] References Cited

U.S. PATENT DOCUMENTS

| | | |
|---|---|---|
| 3,758,830 | 9/1973 | Jackson . |
| 3,881,181 | 4/1975 | Khaiezadeh . |
| 3,992,940 | 11/1976 | Platzer, Jr. . |
| 4,011,745 | 3/1977 | Gatos et al. . |
| 4,134,095 | 1/1979 | Reddy . |
| 4,182,937 | 1/1980 | Greenwood . |
| 4,229,979 | 10/1980 | Greenwood . |
| 4,244,225 | 1/1981 | Greenwood . |
| 4,293,373 | 10/1981 | Greenwood . |
| 4,305,298 | 12/1981 | Greenwood . |
| 4,343,768 | 8/1982 | Kimura . |

OTHER PUBLICATIONS

Malin et al., "Mass Flow Meter" in IBM Disclosure Bulletin vol. 21 #8, p. 3227.
Pugacz-Muraszkiewicz, I. J. "Detection of Discontinuities in Passivating Layers on Silicon by NaOH Anisotropic Etch," IBM J. Res. Develop., Sep., 1972, pp. 523-529.
Petersen, K. E. "Micromechanical Light Modulator Array Fabricated on Silicon," Applied Physics Letters, vol. 31, No. 8, Oct. 15, 1977, pp. 521-523.
Terry, Stephen C., et al. "A Pocket-Sized Personal Air Contaminant Monitor," 175th National Meeting of the American Chemical Society, Mar. 15, 1978.
Bassous, Ernest, "Fabrication of Novel Three-Dimensional Microstructures by the Anisotropic Etching of (100) and (110) Silicon," IEEE Transactions on Electron Devices, Vo. Ed. 25, No. 10, Oct. 1978, pp. 1178-1185.
Petersen, K. E. "Dynamic Micromechanics on Silicon: Techniques and Devices," IEEE Transactions on Electron Devices, Vo. Ed. 25, No. 10, Oct. 1978, pp. 1241-1250.
Peterson, K. E. "Micromechanical Membrane Switches on Silicon," IBM J. Res. Develop., vol. 23, No. 4, Jul. 1979, pp. 376-385.
Roylance, Lynn M. "A Batch-Fabricated Silicon Accelerometer," IEEE Transaction on Electron Devices, vol. Ed. 26, No. 12, Dec. 1979, pp. 1911-1917.
Terry, Stephen C., et al. "A Gas Chromatographic Air Analyzer Fabricated on a Silicon Wafer," IEEE Transactions on Electron Devices, vol. Ed. 26, No. 12, Dec. 1979, pp. 1880-1886.
Jolly, Richard D., et al. "Miniature Cantilever Beams Fabricated by Anisotropic Etching of Silicon," J. Electrochem. Soc., vol. 127, No. 12, Dec. 1980, pp. 2750-2754.
Teschler, Leland, "Ultraminiature," Machine Design, Jan. 8, 1981, pp. 112-117.
Kimura, M. "Microheater and Microbolometer Using Microbridge of SiO₂ Film on Silicon," Electronics Letters, vol. 17, No. 2, Jan. 22, 1981, pp. 80-82.
Jackson, T. N. et al. "An Electrochemical P-N Junction Etch-Stop for the Formation of Silicon Microstructures," IEEE Transactions on Electron Devices, vol. EDL-2, No. 2, Feb. 1981, pp. 44-45.
Van Putten, A. F. P. et al. "Integrated Silicon Anemometer," Electronics Letters, vol. 10, No. 21, Oct. 17, 1974, pp. 425-426.
Van Riet, R. W. M. et al. "Integrated Direction-Sensitive Flowmeter," Electronics Letters, vol. 12, No. 24, Nov. 25, 1976, pp. 647-648.
Rahnamai, H. et al. "Pyroelectric Anemometers," 1980 International Electron Devices Meeting, Washington, D.C. Dec. 8-10, 1980, pp. 680-684.

Primary Examiner—Herbert Goldstein
Attorney, Agent, or Firm—John P. Sumner

[57] ABSTRACT

A flow sensor comprising a pair of thin film heat sensors and a thin film heater is disclosed. A base supports the sensors and heater out of contact with the base with the sensors disposed on opposite sides of the heater. The heater is operated at a constant temperature above ambient temperature under both flow and no-flow conditions. Also disclosed is a flow sensor wherein a portion of the depression is devoid of a side wall.

68 Claims, 20 Drawing Figures

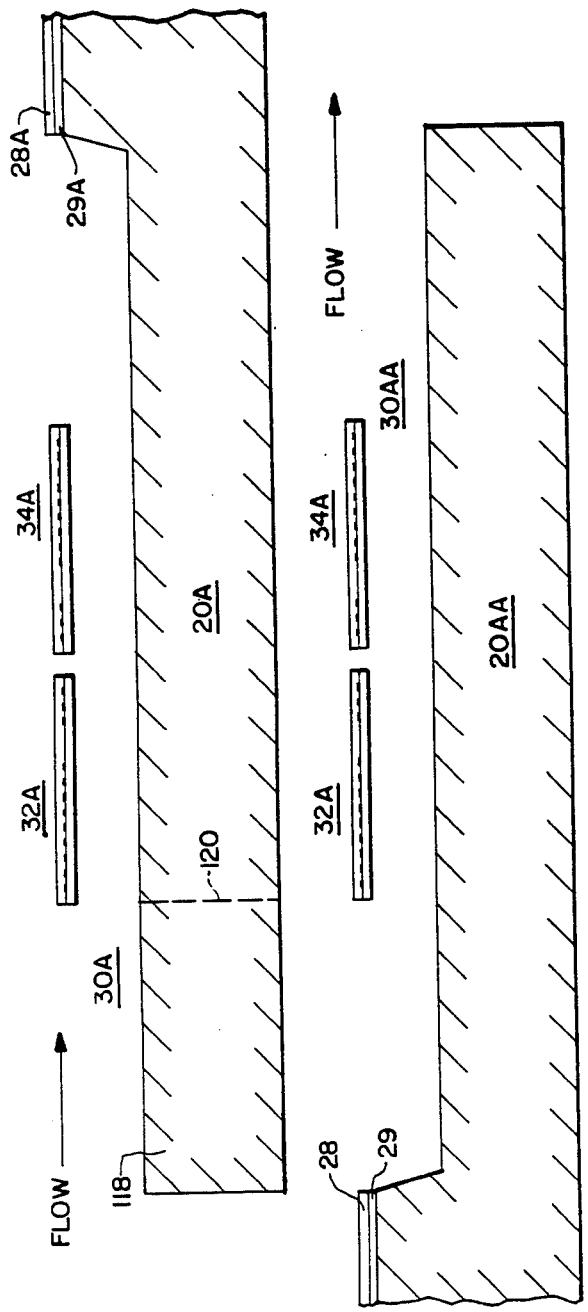
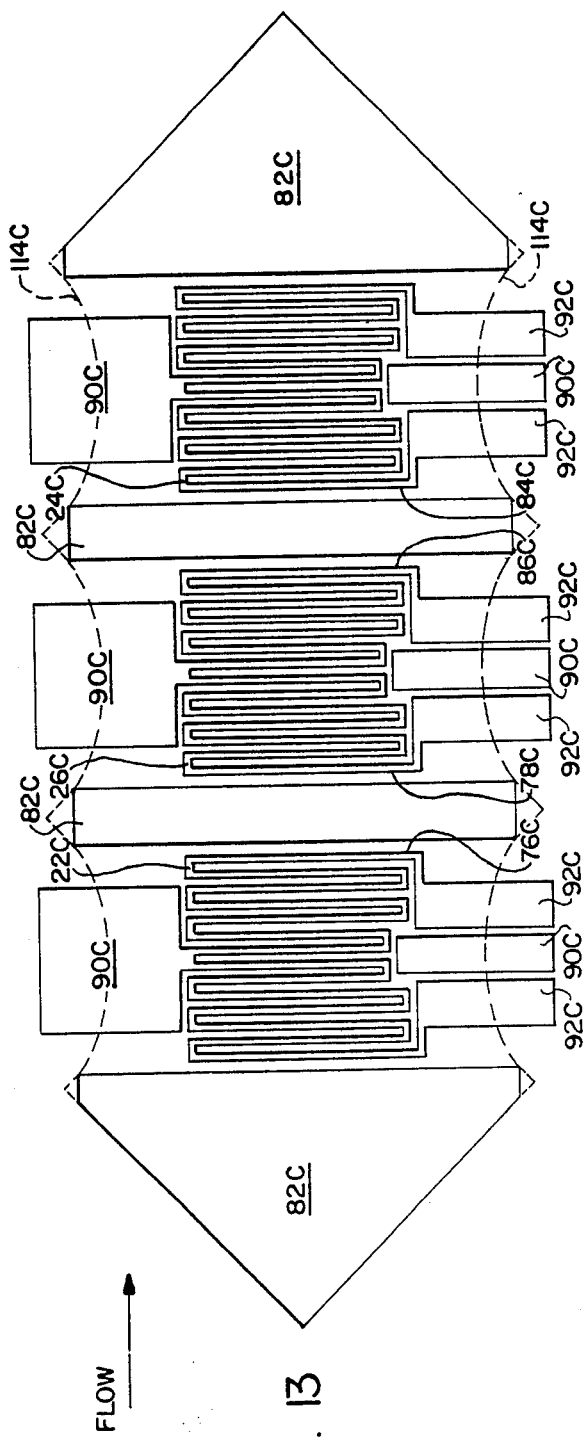
FIG. 11
FIG. 12
FIG. 13

FLOW SENSOR

BACKGROUND AND SUMMARY OF THE INVENTION

The present invention relates to the field of air velocity or flow sensors. Air velocity sensors that are commercially available are commonly of the single hot wire or thermistor type and are typically mounted on the end of a long probe for insertion into the air stream. The temperature drop and the associated change in electrical resistance caused by the cooling effect of the air stream is a measure of the air flow velocity. In these devices the elements are fully exposed to the air stream and so are susceptible to breakage and contamination. Their temperature change with air flow is quite nonlinear and the resulting electrical signal must be carefully linearized by the circuit. Further, they are quite expensive and not suitable for large scale mass production.

The related commercially available mass flow sensor commonly consists of a metal tube through which the air or other gas is passed, a transformer which resistively heats a segment of the tube which is mounted by two massive heat sinks attached to the tube, and two thermocouples attached to the tube symmetrically, one on each side of the hot segment midway between the center and the heat sinks. Air flow through the tube cools the upstream thermocouple and heats the downstream thermocouple and the difference between thermocouple voltages at constant transformer power input is a measure of the mass flow. This is a massive instrument with substantial power requirements. It is not usable in a large duct or even open flow applications. It is expensive and not mass producible on a large scale.

A need exists for an air velocity or mass flow sensor and associated circuitry with these characteristics: long, maintenance-free life, small size, low power, easy adaption to a wide variety of air flow applications, large signal output, and linear or easily linearizable response over a broad velocity range. In addition, it must be mass producible on a large scale and be low in cost.

The literature contains several examples of attempts to improve the flow sensing art with respect to these needs. These attempts, which are further discussed below, generally utilize silicon and its semiconductor properties, or a pyroelectric material. The attempts improve the state of the art in some respects, but remain deficient with respect to many of the characteristics desired in a modern flow sensor. The subject invention advances the state of the art toward the satisfaction of these needs to a substantially greater extent than any of the prior art. The most relevant prior art known to the applicants will now be discussed.

Huijsing et al. (J. H. Huijsing, J. P. Schuddemat, and W. Verhoef, "Monolithic Integrated Direction-Sensitive Flow Sensor", IEEE Transactions on Electron Devices, Vol. ED-29, No. 1, pp. 133-136, January, 1982) disclose a flow sensor comprising a silicon chip with an identical diffused transistor temperature sensing element embedded near each upstream and downstream edge of the chip and a centrally located diffused transistor heater element to raise the chip to as much as 45 degree Centigrade above the air stream temperature. The upstream sensing element is cooled slightly more than the downstream sensing element under air flow conditions, and the temperature difference between the two sensor element transistors results in an electrical current difference between them, which when converted to a voltage difference is a measure of the air flow. The sensor elements must be located on opposite sides of the chip to achieve an appreciable temperature difference between them, and even so, in the air flow range up to 1000 feet per minute, the temperature differences are small, ranging from 0 to under 0.2 degrees Centigrade.

Van Putten et al (A.F.P. Van Putten and S. Middlehoek, "Integrated Silicon Anomometer", Electronics Letters, Vol. 10, No. 21 [October, 1974], pp. 425-426) disclose a silicon chip with an identical diffused resistor element embedded on each of four opposite sides of a chip. All resistor elements are self heated, thus raising the chips and its support substantially above the ambient air stream temperature. The resistors are operated in an electrical double bridge circuit. Under zero air flow, all elements are at the same temperature, and the double bridge is electrically balanced. Under air flow conditions, the upstream and downstream elements which are normal to the flow are cooled more than the side elements which are parallel to the flow. This temperature difference unbalances the electrical double bridge to give a measure of the air flow velocity.

Malin et al. (K. Malin and A. Schmitt, "Mass Flow Meter", IBM Technical Disclosure Bulletin, Vol. 21, No. 8, January, 1979) disclose a large silicon strip with a diffused central heater resistor element centrally located between upstream and downstream diffused sensor resistor elements. This prior art is an analog of the commercially available hot tube mass flow meter. The upstream sensor element is cooled by air stream transport while the downstream element is heated, and the resulting sensor resistor temperature difference results in a voltage difference across the sensor elements which is a measure of air mass flow.

Rahnamai et al (H. Rahnamai and J. N. Zemel, "Pyroelectric Anomometers", paper presented at the 1980 International Electron Devices Society of IEEE, Washington D.C., Dec. 8-10, 1980, pp. 680-684) disclose a thin slab of single-crystal, polished, and crystallographically-oriented lithium tantalate, having a length of 8 mm, a width of 4 mm and a minimum thickness of 0.06 mm, a deposited thin film of metal covering the entire back side of the slab, a front side centrally-located deposited thin film heater resistor element, and an upstream and downstream deposited thin film electrode located equally some distance from the heater element and equally spaced from it. As described in the literature, this slab is supported at its edges on a large modified screw head to provide an essential air flow channel below the slab. The upstream and downstream electrodes act as separate identical capacitor plates, the capacitors having as their other plate the back side electrode and, together with the back side electrode, function as identical upstream and downstream temperature sensing capacitor elements. In operation, an a.c. voltage of low frequency, for example: 2 to 10 Hz, is applied to the heater element causing a periodic heating of that element above the ambient air stream temperature. The sensor elements are correspondingly periodically heated by thermal conduction, to a large extent through the pyroelectric lithium tantalate slab, and under zero flow conditions, each sensor element develops an identical periodic pyroelectric voltage caused by the temperature-dependent electrical polarization of the pyroelectric slab. The voltage difference between sensor elements is then zero at zero air flow. Under flow conditions, the upstream sensing element cools more than the downstream sensing element as stated in the literature, and the resulting sensor element temperature difference causes a voltage difference that is a measure of the flow.

As previously indicated, these attempts improve the state of the art in some respects, but remain deficient with respect to many characteristics desired in a modern flow sensor. The subject invention advances the state of the art toward the satisfaction of these needs to a substantially greater extent.

BRIEF DESCRIPTION OF THE DRAWINGS

FIGS. 1, 2, 3, 3A and 9–17 illustrate alternate embodiments of the present invention.

DESCRIPTION OF THE PREFERRED EMBODIMENTS

Figure 1:
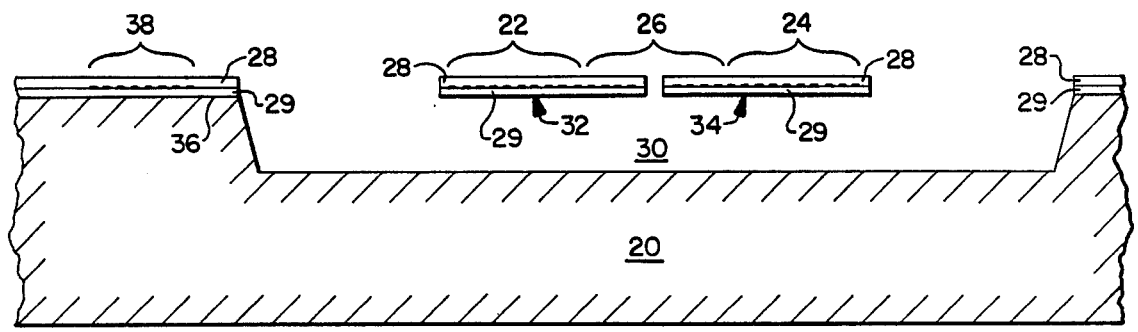

The present invention comprises a pair of thin film heat sensors 22 and 24, a thin film heater 26 and a base 20 supporting the sensors and heater out of contact with the base. Sensors 22 and 24 are disposed on opposite sides of heater 26.

In the preferred embodiment of the present invention, body 20 is a semiconductor, preferably silicon, chosen because of its adaptability to precision etching techniques and ease of electronic chip producibility. The preferred embodiment includes two identical temperature sensing resistor grids 22 and 24 acting as the thin film heat sensors and a centrally located heater resistor grid 26 acting as the thin film heater. Sensors 22 and 24 and heater 26 are preferably fabricated of nickel-iron, herein sometimes referred to as permalloy, having a preferred composition of 80 percent nickel and 20 percent iron. The sensor and heater grids are encapsulated in a thin film of dielectric, typically comprising layers 28 and 29 and preferably silicon nitride, to form thin film members. In the embodiment shown in FIGS. 1 and 2, the sensor comprises two thin film members 32 and 34, member 32 comprising sensor 22 and member 34 comprising sensor 24, each member comprising one-half of heater 26 and having a preferred dimension of 150 microns wide and 400 microns long.

The preferred embodiment of the present sensor further comprises an accurately defined air space 30 which results in an air space effectively surrounding elements 22, 24, and 26. The effectively surrounding air space is achieved by fabricating the structure on silicon surface 36, thin film elements 22, 24, and 26 having a preferred thickness of approximately 0.08 to 0.12 micron with lines on the order of 5 microns wide and spaces between lines on the order of 5 microns, the elements being encapsulated in a thin silicon nitride film preferably having a total thickness of approximately 0.8 microns or less, and by subsequently etching an accurately defined air space, preferably 125 microns deep, into silicon body 20 beneath members 32 and 34.

Figure 3:
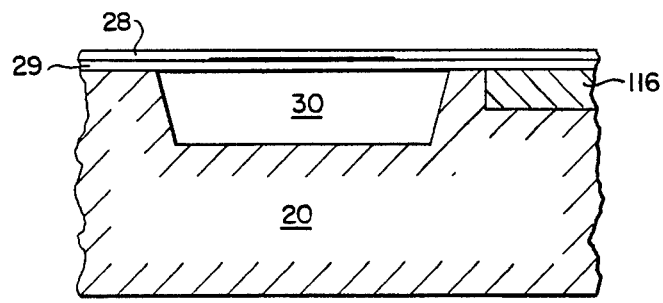
Figure 3A:
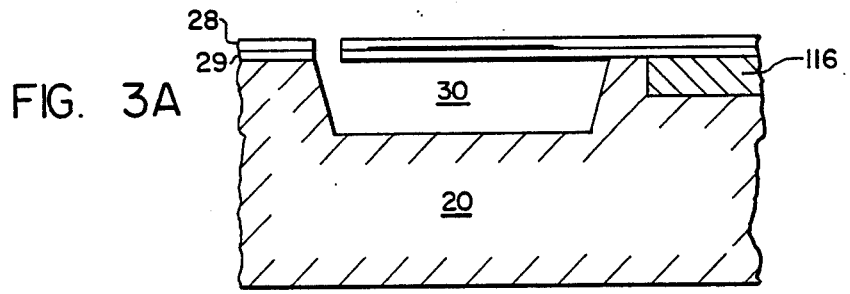

Members 32 and 34 connect to top surface 36 of semiconductor body 20 at one or more edges of depression or air space 30. As illustrated in FIG. 3, members 32 and 34 may be bridged across depression 30; alternately, for example, members 32 and 34 could be cantilevered over depression 30 as shown in FIG. 3A.

Silicon nitride is a highly effective solid thermal insulator. Because the connecting silicon nitride film within members 32 and 34 is exceedingly thin and a good insulator, it contributes very little to the loss of heat from heater 26, and nearly all the heat conducted from heater resistor 26 to sensing resistors 22 and 24 is conducted through air surrounding heater 26. Moreover, the supporting silicon nitride film has such a low thermal conductivity that sensing resistor grids 22 and 24 can be located immediately adjacent to heating resistor grid 26 and yet can allow most of the heat conducted to sensing resistor 22 and 24 from heater resistor 26 to pass through the surrounding air rather than through the supporting nitride film. Thus, sensing resistor grids 22 and 24 are in effect suspended rigidly in the air space near heater resistor 26 and act as thermal probes to measure the temperature of the air near and in the plane of heater resistor grid 26.

The operation of the present invention in sensing air flow can be described with reference to FIG. 2. Heater resistor grid 26 operates at a preferred constant average temperature difference at 200 degrees Centigrade elevated above the temperature of silicon chip 20 which temperature is not appreciably different from the ambient air stream temperature (the temperature of semiconductor body 20 is typically elevated about 0.5 degrees Centigrade above ambient air stream temperature when heater 26 is operated at 200 degrees Centigrade above ambient and when semiconductor body 20 is mounted on a heat sink such as a TO-100 metal header or a cerdip package. The power required by heater resistor 26 to achieve 200 degrees Centigrade above ambient temperature is very small, being less than 0.010 watt.

In the preferred embodiment at zero air flow velocity, thermal conduction from heater resistor grid 26, largely through the surrounding air space including air space 30, heats identical temperature sensing resistor grids 22 and 24 to an average temperature of about 140 degrees Centigrade or about 70 percent of the temperature elevation of heater element 26. In the preferred embodiment illustrated, sensor grids 22 and 24 are precisely symmetrically located with respect to heater grid 26 so that at zero air flow they have identical temperatures and have no differences between their resistances. Consequently, a small probe current, 0.1 to 1.0 milliamperes preferred, through both sensor resistances 22 and 24 will develop no voltage difference at zero air flow velocity.

With air flow present, upstream resistor sensor 22 will be cooled by the transportation of heat away from sensor 22 toward heater resistor grid 26, whereas downstream sensor 24 will be heated by transportation of heat toward the sensor from heat resistor grid 26. Consequently, a resistance difference between sensor resistances 22 and 24 will be present with a corresponding difference in voltage drop which is a measure of the air flow. Typical unamplified voltage differences can be as high as 0.1 volt at a 1500 feet per minute flow velocity.

In the preferred operation of the present sensor, sensors 22 and 24 are operated with constant current such that temperature field changes can be sensed under flow conditions as previously described. Other arrangements are also possible including arrangements which would operate the sensors in a constant voltage mode, constant temperature (constant resistance) mode, a constant power mode, or any mode that produces a differential signal.

Because of the exceedingly small thermal mass of the heater and sensor element structure and the thermal insulation provided by the thin silicon nitride connecting means to the supporting silicon body, and because of the surrounding air space, response time of the present sensor is very short, with response time constants of 0.005 second having been measured. Consequently, sensor elements 22 and 24 can respond very rapidly to air flow changes.

Figure 4:
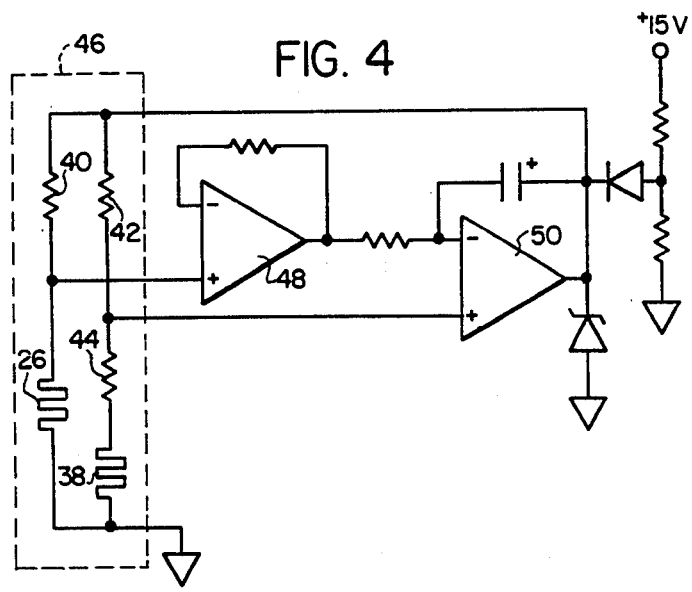
FIGS. 4 and 5 illustrate circuitry compatible with the present invention.
Figure 5:
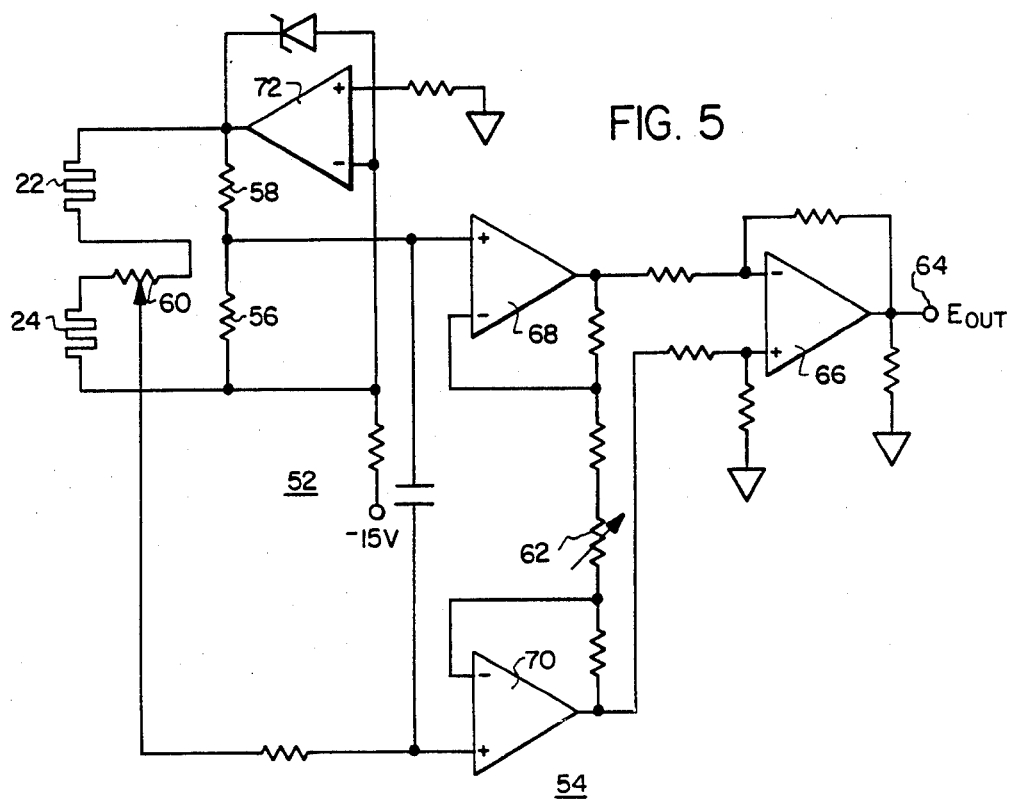

In the preferred operation of the present sensor, heater 26 is operated at a constant temperature above ambient temperature, sensors 22 and 24 being operated at constant current, and the changing temperatures of sensors 22 and 24 are sensed as changes in resistance. Circuits for accomplishing these functions are illustrated in FIGS. 4 and 5. The circuit in FIG. 4 controls the temperature of heater 26 while the circuit in FIG. 5 provides an output voltage that is proportional to the resistance difference between heat sensing resistors 22 and 24.

In preferred embodiments of the present sensor, ambient temperature is monitored by a reference resistor 38 which is heat sunk onto semiconductor body 20. Resistor 38 may be a permalloy grid formed substantially like grids 22, 24 and 26 and is typically encapsulated in dielectric layers 28 and 29 mounted on surface 36.

The typical 0.8 micron total thickness of dielectric layers 28 and 29 is very thin and, accordingly, permits relatively good conduction and heat transfer perpendicular to the layers to and from resistive grids 22, 24, 26 and 38. Thus, reference resistor 38, being attached by the encapsulating dielectric directly to surface 36 of semiconductor body 20, readily monitors the temperature of the semiconductor body, which stays within 0.5 degrees Centigrade of ambient temperature even with resistor grid 26 elevated to 200 degrees Centigrade above ambient. Accordingly, heat sunk reference resistor 38 may be used to monitor ambient air flow temperature by monitoring a temperature that is very close to that of semiconductor body 20, which in turn is very close to ambient temperature.

The heater control circuit illustrated in FIG. 4 uses a wheatstone bridge 46 to maintain heater 26 at a constant temperature rise above ambient as sensed by heat sunk reference resistor 38. As previously indicated, the constant temperature rise above ambient is preferably set at approximately 200 degrees Centigrade. Wheatstone bridge 46 is shown comprising heater resistor 26 and a resistor 40 in its first leg and a resistor 42, heat sunk resistor 38, and a resistor 44 in its second leg. An error integrator comprising amplifiers 48 and 50 keeps bridge 46 balanced by varying the potential across it and thus the power dissipated in heater resistor 26.

The circuitry of FIG. 5 monitors the resistance difference between downstream sensor 24 and upstream sensor 22. This circuitry includes a constant current source 52 comprising an amplifier 72 and a differential amplifier 54 comprising amplifiers 68 and 70. The constant current source drives a wheatstone bridge comprising two high impedance resistors 56 and 58 in one leg and the two sensing resistors 22 and 24 with a nulling potentiometer 60 in the other leg. The gain of differential amplifier 54 is adjusted by potentiometer 62. Output 64 provides an output voltage that is proportional to the resistance difference between the two sensing resistors 22 and 24.

Amplifiers 48, 50, 66 and 72 may each comprise one-fourth of an LM 324. Amplifiers 68 and 70 may each comprise one-half of an OP-10.

Figure 6:
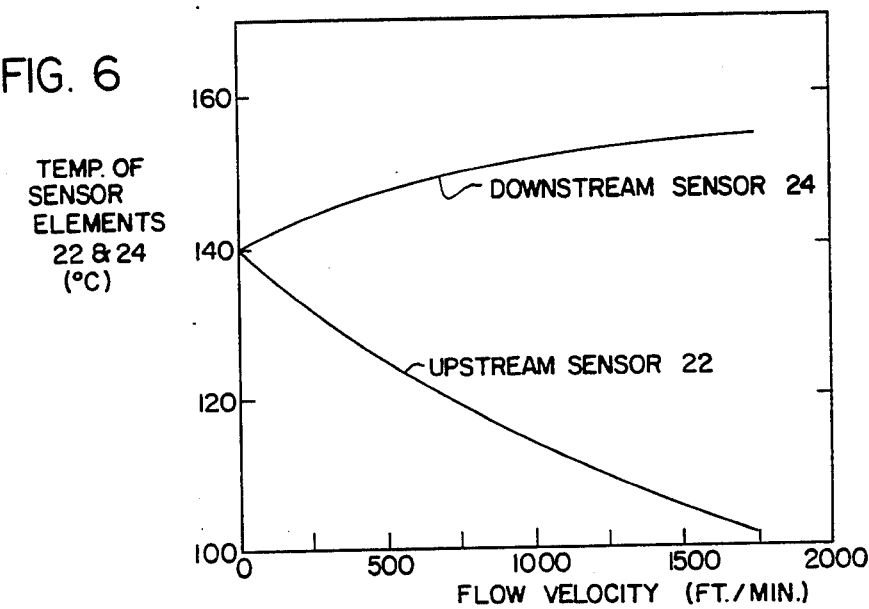
FIGS. 6, 7, 8, 18, and 19 illustrate performance of the present invention.

One characteristic of the present sensor is that it is capable of obtaining large temperature differences between sensing resistors 22 and 24 for a broad range of air flow velocities. These large temperature differences result in a large voltage output at output 64 as a function of the air flow velocity with greater accuracy and ease of flow measurement. An example of the large temperature differences achievable in the preferred embodiment of the present invention is shown in FIG. 6. The large temperature differences are obtained by the combined effect of air flow cooling of upstream sensor resistor 22 and air flow heating of downstream sensor resistor 24 by heat transport from heater resistor 26. The large combined heating and cooling effect is made possible in part by a relatively strong thermal coupling of the sensor resistors to the air flow which in turn is made possible by the substantial thermal isolation of sensor resistors 22 and 24 from silicon semiconductor body 20 which in turn is made possible by the relatively small thermal conductance along the silicon nitride connecting film within members 32 and 34 and by accurately defined air space 30, typically about 125 microns in depth, between members 32 and 34 and supporting silicon body 20.

The large combined heating and cooling effect is also made possible in part by the large cooling that is possible for upstream resistor 22 which is made possible in part by the high temperature of upstream resistor 22 which is made possible in part by the thermal insulation from silicon supporting body 20 through surrounding air space 30 and the small thermal conductance along thin film member 32 and in part by the high temperature of heater grid resistor 26 which high temperature is made possible also by the thermal insulation of heater grid 26 from silicon supporting body 20 through surrounding air space 30 and the small thermal conductance along thin film members 32 and 34.

The large combined heating and cooling effect is also made possible in part by the large heating effect of downstream resistor grid 24 by air flow transport from heater resistor grid 26 which is made possible by the thermal isolation of downstream resistor grid 24 from silicon supporting body 20 by surrounding air space 30 and by the small thermal conductance along thin film member 34 and by the high temperature of heater resistor grid 26 which in turn is made possible by the thermal isolation of heater grid 26 from silicon supporting body 20 through the thermal isolation of surrounding air space 30 and the small thermal conductance along thin film members 32 and 34.

The large combined heating and cooling effect is also made possible in part by choice of an optimal spacing between the center of each sensing resistor grid 22 and 24 and the proximal edge of heater resistor 26.

Figure 7:
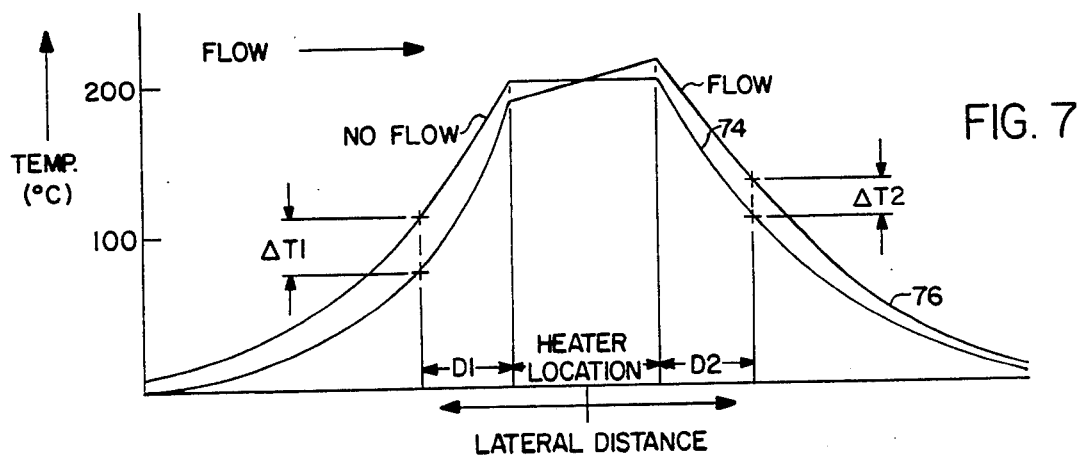

FIG. 7 illustrates the relationship between an idealized zero flow temperature profile 74 of the air, an idealized profile 76 for an arbitrary air flow velocity, and the optimal spacing for idealized narrow sensor elements. The cooling effect of the air flow on the upstream side of heater resistor 22 lowers the temperature profile by an amount delta T1 which varies with distance and is largest at a distance D1 from the upstream edge of heater resistor 22. The heat transported downstream by the flow increases the air temperature by an amount delta T2 which varies with distance and is largest at a distance D2 from the downstream edge of heater resistor 22. D1 is not necessarily equal to D2, but to achieve zero output signal from the flow sensor at zero flow, the sensor resistor temperatures at zero flow must be the same and, consequently, in the preferred embodiment of the present flow sensor, in which sensor resistance grids 22 and 24 are not narrow, the distance D1 to the center of grid 22 must equal the distance D2 to the center of grid 24. Therefore, the flow sensor output signal is maximized by disregarding signs and maximizing the sum of the average over grid 22 of delta T1 and the average over grid 24 of delta T2 subject to the condition that D1 equals D2. This has been found to occur at some intermediate point at a distance D1 equalling D2 and comparable to the half-width of heater resistor grid pattern 26 for flow velocities in the hundreds of feet per minute range.

The relatively large sum of average delta T1 and average delta T2, for example, about 50 degrees Centigrade for a flow of about 1700 feet per minute, relative to the very low temperature differences of prior art flow sensors is due to the thermal insulation of heater and sensor elements 22, 24 and 26 from silicon chip 20 obtained by use of the very thin silicon nitride within members 32 and 34 which have very small thermal conductance along them and by accurately defined air space 30 that effectively surrounds heater resistor 26 and sensor resistors 22 and 24 with air. The accurate definition of surrounding air space 30 including lateral and depth dimensions of depression 30 beneath heater 26 and sensor elements 22 and 24 is accomplished by precision etching techniques explained below. The accurate definition of the surrounding air space makes a uniform degree of thermal isolation possible from chip to chip which in turn makes possible a uniform chip to chip air flow response.

In prior art in which the sensor elements are in intimate contact with or embedded in a silicon chip or other base, it is necessary to separate the sensing elements from the heater by a substantially large distance relative to the heater width dimension in order to achieve a usable temperature difference, which difference, even so, is approximately a factor of 100 (two orders of magnitude) less than that of the thermally isolated heater resistor of the present invention.

For example, in the prior art of Rahnamai et al, in which the heating and sensing elements are deposited on a lithium tantalate slab (which has a lower intrinsic conductivity than that of silicon but a 70 percent greater intrinsic conductivity than silicon nitride), the heating and sensing elements are in intimate contact with a supporting lithium tantalate slab that is at least 60 microns thick, which is at least 75 times thicker than the 0.8 micron nitride film within members 32 and 34 of the present sensor. The thermal conductance of a 60 micron slab between a heater element in contact with such a slab and a similarly supported sensor element located between zero and 500 microns from the edge of the heater element (as in the Rahnamai et al. art) dominates the thermal conductance of the air paths between heater and sensor. The heater is, therefore, not effectively surrounded by an air space, and a large part of the heat conducted from the heater element to the sensor elements passes through the slab. Therefore, for a sensor element in the zero to 500 micron distance range, the air flow velocity will be able to cause only a relatively small sensor element temperature change relative to that of the present sensor in which sensors 22 and 24 undergo a very substantial temperature change while in the zero to 100 micron distance range from heater 26.

Another advantage of the present invention over prior art is that the accurately defined air space around sensor and heater elements 22, 24 and 26 effectively thermally isolates them from silicon supporting chip 20 which therefore undergoes a negligible temperature elevation of approximately 0.5 degrees Centigrade or less as previously explained. Therefore, the air flow response of the present invention is quite independent of the thermal contact between silicon chip 20 and its required supporting body, in a housing, for example. By contrast, in the prior art, the response of a sensor depends significantly on the thermal contact to the required supporting body. In the Rahnamai et al. sensor, the response to flow is extremely dependent upon the means of structural support. In the prior art of Huijsing et al., it is stated that the silicon chip carrier plate reduces the response to flow. In the prior art of Van Putten et al, the chip was thinned from the normal 200 micron thickness to 50 microns in order to minimize thermal shorting of the silicon and would, therefore, be quite vulnerable to a sensitivity reduction by carrier plate thermal conduction. In the Malin et al. prior art, a long silicon strip was used to minimize the effects of thermal shorting of the silicon, and a carrier plate would have a similar effect.

Figure 8:
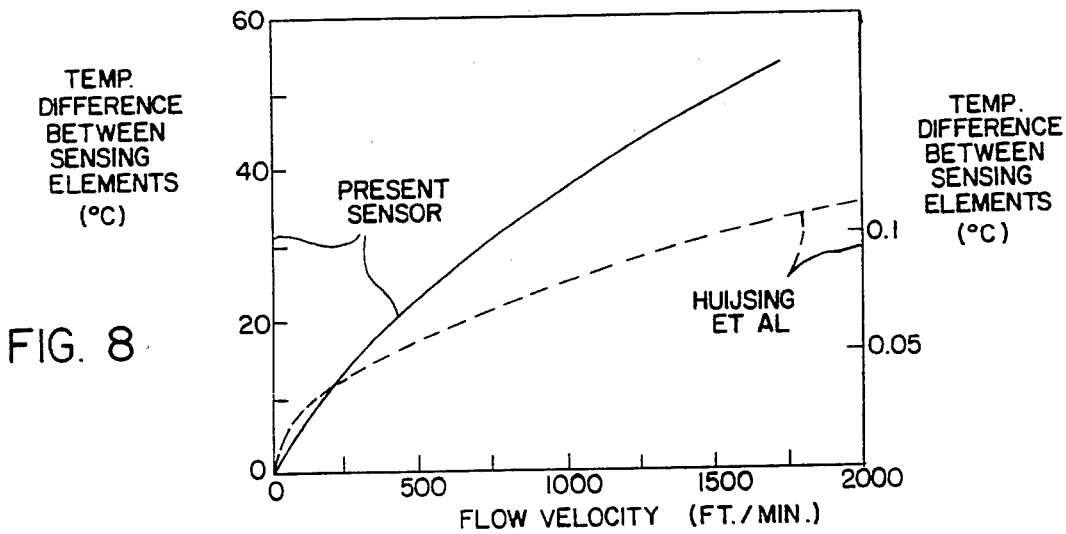

A second advantage of the present invention is a more linear dependence of the temperature differential between sensors 22 and 24 over a broad flow range. In the prior art, this temperature difference between sensors as a function of air flow is proportional to the square root of air flow velocity. With this dependence, known as a parabolic response, the change of sensor temperature difference for a given change in air velocity, v, varies as $\frac{1}{2}(v$ to the $\frac{1}{2})$, and the resulting incremental response to air flow becomes substantially smaller at higher air flow velocities of interest. The resulting incremental response is, consequently, more susceptible to errors caused by noise fluctuations or drifts in associated electronic circuits. The more linear air flow response of the present sensor and the large unamplified signal voltage obtainable over the flow range of interest, for example, from zero to 2000 feet per minute or higher, substantially reduces possible drift errors at high flow velocities. A typical air flow velocity response for the present sensor is shown in FIG. 8, which also compares the performance of the present sensor with that of Huijsing et al.

As previously indicated in a preferred mode of operation of the present sensor, the total resistance of heater grid 26 is held constant at a given ambient by the disclosed circuitry. The more linear characteristic discussed above is obtained by using sensor resistance grids 22 and 24 that are broad enough and appropriately located to cover most of the temperature gradient region in the vicinity of heater resistor 26 (see also FIG. 7).

In such a mode of operation, upstream sensor resistor 22 has an inner edge 76 in close proximity (one line width of 5 microns in one example) to the near edge 78 of heater resistor grid 26. At such a separation from near edge 78 of heater resistor grid 26, the zero flow air temperature near heater resistor edge 78 is close to that of edge 78. In a typical embodiment, where sensors 22 and 24 have a width of approximately 100 microns, outer edge 80 of sensor resistor grid 22 is located approximately 100 microns from near edge 78 of heater resistor grid 26. At the 100 micron separation, the zero air flow temperature is closer to that of the ambient air stream and to that of silicon chip 20 than it is to the temperature of heater resistor 26 (see also FIG. 7). Therefore, outer edge 80 of sensor resistor grid 22 is easily cooled to near the limiting temperature of silicon chip 20 by low velocity air flow, whereas the inner regions of sensor resistor grid 22 (near edge 76) are more tightly coupled thermally to heater resistor 26 and respond more readily to the higher air flow velocities before the limiting temperature of the ambient air stream is approached. Accordingly, the composite effect of the temperature change from each resistor grid line (lines spaced over the 5 to 100 micron distance from heater edge 76) for an increment of air flow is to keep the corresponding flow of the upstream resistor temperature response curve more nearly constant over a broad airflow range. This is in contrast to what would be found for a single point or line element at any one distance from the edge of the heater as is approximately the case in prior art. The measured more linear temperature response of upstream sensor 22 over a broad air flow range in the preferred embodiment of the present invention is shown in FIG. 6.

For downstream sensor element 24 the increase of sensor resistance due to air flow heat transport is smaller than the resistance cooling effect of air flow on up stream sensor 22, but in the preferred embodiment shown, the 5 micron spacing between inner edge 84 of sensor resistor 24 and near edge 86 of heater resistor 26 and the spacing of approximately 100 microns between outer edge 88 of sensor resistor 24 and near edge 86 of heater grid 26, being close spacings relative to the prior art, permits effective heat transport by air flow to sensor resistor 24 from heater grid 26 over a wide velocity range. This effective heat transport and the thermal isolation of sensor resistor 24, primarily by surrounding air space 30, permits the temperature of sensor resistor 24 to rise substantially with increasing air flow velocity over a broad velocity range. The measured temperature change of downstream resistor 24 as a function of air flow velocity in the preferred embodiment of the present invention is shown in FIG. 6. The composite response of upstream sensor 22 and downstream sensor 24 to air flow is shown in FIG. 8 in which the superior signal level and linearity of air flow response curve over a broad flow range can be compared to a response curve of the prior art of Van Huijsing et al.

One advantage of having the large response to air flow velocity with the present sensor is that it facilitates applications where it is desirable to reduce flow velocity to achieve longer sensor life and greater freedom from turbulence effects. The present sensor also has the advantage that the temperature sensitive thin film sensors 22 and 24 and heater 26 are largely protected from damage by impacting particles in the air stream since the high velocity regions of the air stream are a substantial distance away from the neighborhood of the low velocity surface layer of the flow where the thin films are located, and since the flow can be directed parallel to the plane occupied by the thin films.

Figure 2:
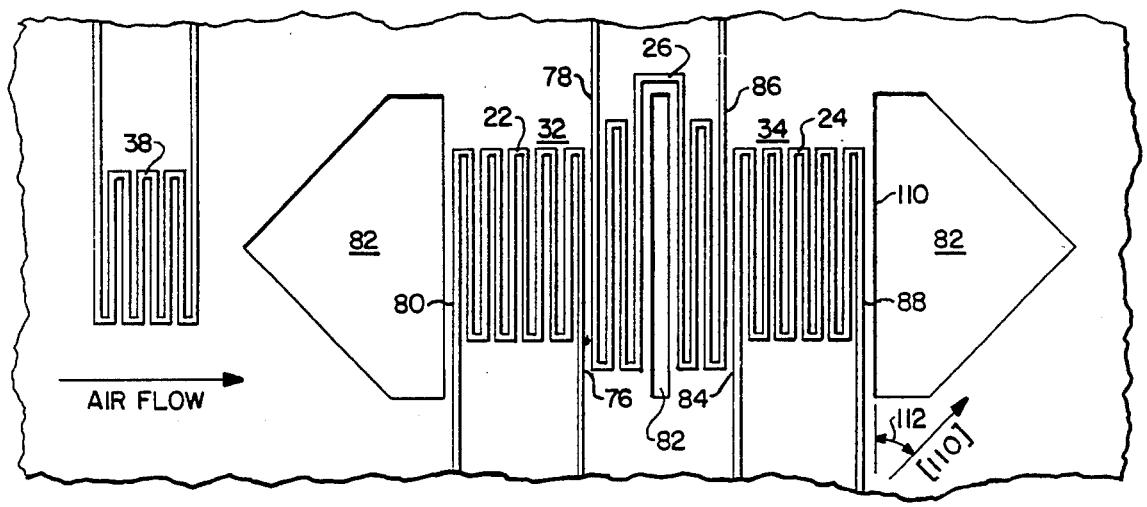
Figure 9:
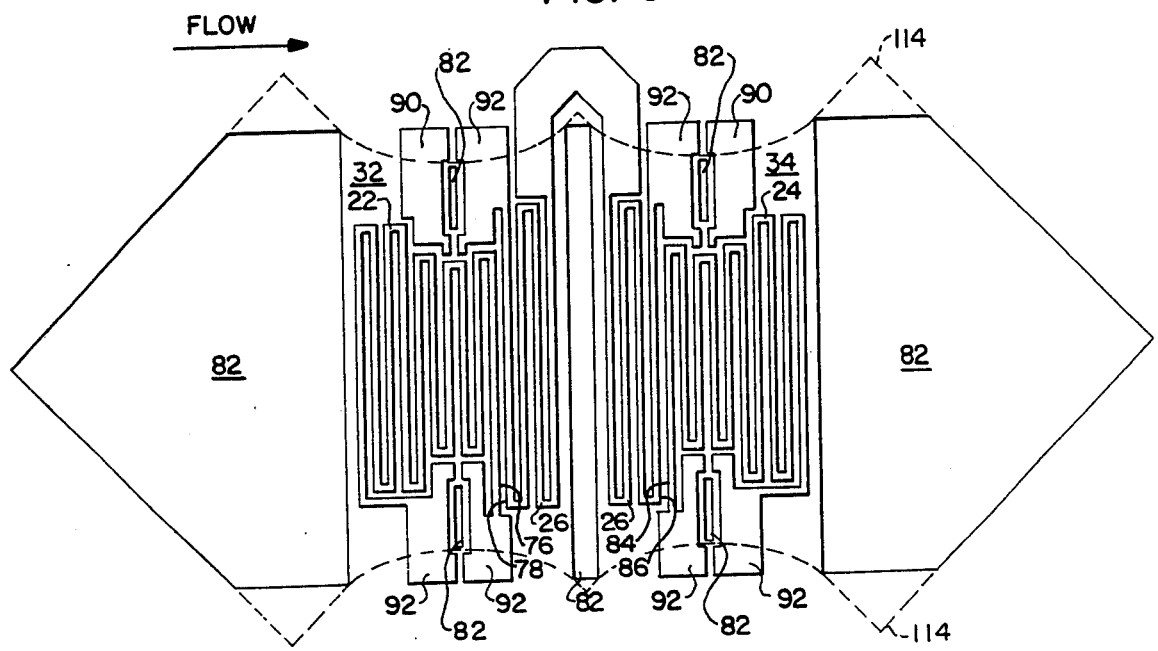

Elements 22, 24, and 26 are schematically represented in FIG. 2, one preferred embodiment of these elements being detailed in FIG. 9. Areas 82 are cut in the silicon nitride to facilitate etching as further described below. Leads 92 and permalloy areas 90 are made symmetrically to insure symmetrical heat conduction properties on members 32 and 34, each of which are approximately 0.006 inch wide and 0.012 inch long for the embodiment shown. Elements 22, 24 and 26 are each 800 angstroms (0.08 micron) thick, with elements 22 and 24 having a resistance of 740 ohms and element 26 having a resistance of 840 ohms. In this embodiment, sensors 22 and 24 have a width of approximately 100 microns and a length of approximately 175 microns. As previously indicated, the proximal edges of sensors 22 and 24 are one line width (5 microns) away from heater 26. That is, edge 76 of sensor 22 is one line width (5 microns) away from edge 78 of heater 26, and edge 84 of sensor 24 is one line width (5 microns) away from edge 86 of heater 26.

In various alternate embodiments of the present invention, unless otherwise mentioned, the resistive elements comprising the heater and sensors are typically 800 angstroms (0.8 micron) in thickness, preferred line widths within a grid are 5 microns, preferred line spacings within a grid are 5 microns, and the grids are preferably composed of permalloy having a preferred composition of 80 percent nickel and 20 percent iron. As with other dimensions listed in the present application, these dimensions are preferred dimensions which have been used in actual devices and are not deemed to be limiting, since these parameters could be substantially varied depending upon application.

Figure 10:
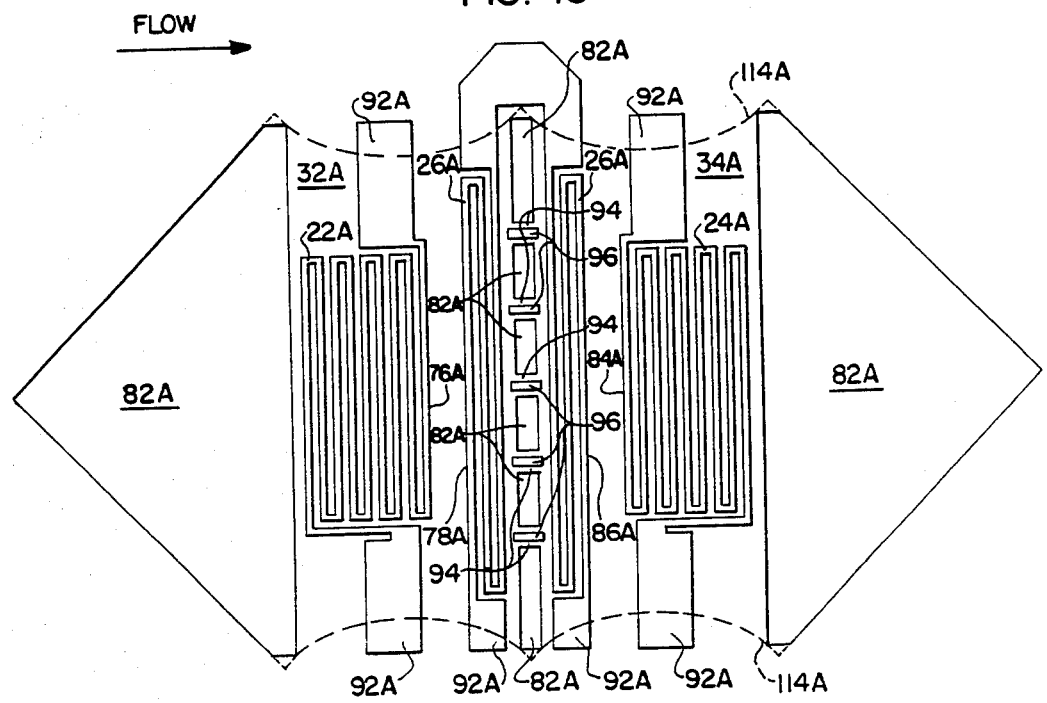

An alternate preferred embodiment of the present invention is illustrated in FIG. 10. As with the embodiment illustrated in FIG. 9, the FIG. 10 embodiment comprises two members, in this case labeled 32A and 34A, bridged over a depression or air space such as 30, and a split heater 26A is employed, half of heater 26A being on member 32A and half of heater 26A being on member 34A. Sensor elements 22A and 24A are more narrow than elements 22 and 24, the dimensions of elements 22A and 24A being approximately 90 microns wide and 175 microns long. Further, sensors 22A and 24A are located further away from heater 26A than in the previously discussed embodiment, the proximal edges of sensors 22A and 24A being located 0.001 inch (25 microns) away from heater 26A. That is, edge 76A of heater 22A is located 0.001 inch (25 microns) from edge 78A of heater 26A, and edge 84A of sensor 24A is located 0.001 inch (25 microns) from edge 86A of heater 26A. In this embodiment, bridges 32A and 34A are each approximately 0.006 inch wide and 0.014 inch long. Sensors elements 22A and 24A have a resistance of 670 ohms, while heater 26A has a resistance of 840 ohms. Further, in the embodiment of FIG. 10, bridges 32A and 34A are interconnected by interconnects 94 which are reinforced by permalloy patches 96. Interconnects 94 serve to help keep members 32A and 34A in the same plane. Sensor leads 92A are located along the center lines of bridges 32A and 34A to add strength along the center lines of the members.

Figure 18:
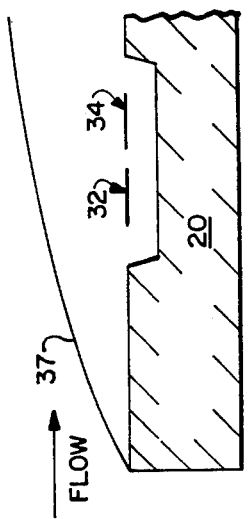
Figure 19:
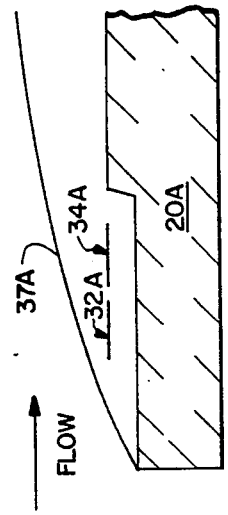

Preliminary tests on the embodiment of FIG. 10 provided an output approximately 100 percent greater for an equal flow rate than the embodiment of FIG. 9. However, during these measurements, the embodiment of FIG. 9 was located in the center of a chip such as illustrated in FIG. 1, whereas the embodiment of FIG. 10 was located at the edge of a chip so that either the upstream portion of depression 30A was open to receive flow unimpeded by a side wall, as shown in FIG. 11, or was open at the downstream side so that flow could more easily exit, or be more easily drawn through, air space 30AA, as illustrated in FIG. 12. Of the FIGS. 11 and 12 alternate embodiments, the FIG. 11 embodiment provided a substantially superior output, although both embodiments provided an air flow response greater than the FIG. 9 embodiment located in the center of the chip. Whether the increased performance of the FIG. 10 embodiment was due primarily to location or design or both is not yet determined. Note that the embodiment of FIG. 11 may be modified by removing at least a portion of the leading edge of body 20A, thus increasing the exposure of the leading edge of member 32A to flow; for example, portion 118 of body 20A may be removed back to line 120. Note also that the substantially superior performance of the FIG. 11 embodiment over the embodiment of FIG. 9 located in the center of a chip can be explained at least in part in view of two factors. First, in the embodiment of FIG. 11, as previously explained, the upstream portion of depression 30A is open to receive flow unimpeded by a side wall. In this manner, members 32A and 34A, particularly the leading edge of member 32A, is more readily open to receive flow. Second, an arbitrary free stream velocity envelope 37A that originates at the leading edge of semiconductor body 20A can be seen to place members 32A and 34A closer to high velocity air flow than an identical arbitrary free stream velocity envelope 37 originating at the leading edge of semiconductor body 20; in the case of envelope 37, members 32 and 34 are not as close to high velocity air flow and, accordingly, are not exposed to as high a velocity air stream (see FIGS. 18 and 19).

In the embodiment of FIG. 13, sensors 22C, 24C and heater 26C are each located on an individual member bridging the depression. In this embodiment, the edges of heater 26C are located 0.002 inch (50 microns) from the proximal edges of sensors 22C and 24C; that is, edge 78C of heater 26C is located 0.002 inch (50 microns) from near edge 76C of sensor 22C, and heater 86C is located 0.002 inch (50 microns) from near edge 84C of sensor 24C. Each element 22C, 24C and 26C in this embodiment has an impedance of 1000 ohms and is approximately 135 microns wide and 150 microns long. Each of the three bridges in this embodiment is approximately 0.006 inch wide by 0.012 inch long. Permalloy patches 90C were added to strengthen the members and to make the heat conducting properties at both ends of the bridge substantially identical in view of leads 92C.

The air flow response of the sensor illustrated in FIG. 13 was considerably less than the response of the sensors illustrated in FIGS. 9 and 10. It is thought that this decrease in response is due to the increased spacing (50 microns) between the edges of heater 26C and the respective proximal edges of sensors 22C and 24C and to the increased width of the sensors resulting in an increased distance between the center line of the heater and the center lines of the sensors. Consequently, referring to FIG. 7 as related to the FIG. 13 embodiment, it is thought that the centerline of the sensor resistance elements 22C and 24C are located substantially beyond optimal distances D1 and D2, with the result that the average temperature differences obtainable between sensors 22C and 24C are substantially less for a given flow velocity.

As discussed earlier, it is desirable to maximize the sum of the average delta T1 over one sensor and the average delta T2 over the other sensor (FIG. 7). Ideally, this would be best accomplished by using very narrow sensing resistance elements which would have very low resistances. However, practical circuit considerations typically require sensing resistance element values of at least 100 ohms, and preferably in the 700 to 1000 ohm range. Combining this requirement with practical limitations on the length of the thin film member structures and the limitations on current density and the associated resistor element film thickness as discussed subsequently, it is found that sensor grid element widths should typically be at least 75 microns wide to achieve the preferred resistance values. Therefore the typically preferred sensor grid element embodiment is not narrow but has an appreciable width.

A consequence of widths of 75 microns or greater is that to maximize the sum of average delta T1 and average delta T2 on the idealized temperature curves of FIG. 7, the proximal edges of the sensor grids must be so close to the edges of the heater grid that an undesirable thermal conductance from the heater grid through the nitride member spacing to the proximal edge of each sensor grid in the preferred embodiment of FIG. 9 is not entirely negligible, and a less than maximum response may be found. Nevertheless, observed response for spacings of only 5 miicrons is 3 to 5 times that of prior art, and is comparable but somewhat less than the response of the embodiment of FIG. 10. These considerations and results lead to the conclusion that, with all other dimensions remaining equal, the thickness dimension of 0.8 micron for the nitride member structure cannot be substantially increased in the preferred embodiment without causing appreciable loss of air flow response, since an increased member thickness would result in an increase in the thermal conduction through the members with the near edges of the sensors being more tightly thermally coupled to the heater.

A possible disadvantage of the embodiment shown in FIG. 13 is that, since the heater and the two sensors are all on separate members bridged across the depression, any movement of the members through bimorph or other processes would tend to put at least portions of the heater and sensors in different planes. Note that this disadvantage is substantially eliminated in the embodiments of FIGS. 9 and 10 since each sensor is directly adjacent to a portion of the heater on the same member as the sensor, thus insuring a more coplanar relationship between the heater and the sensors.

Figure 14:
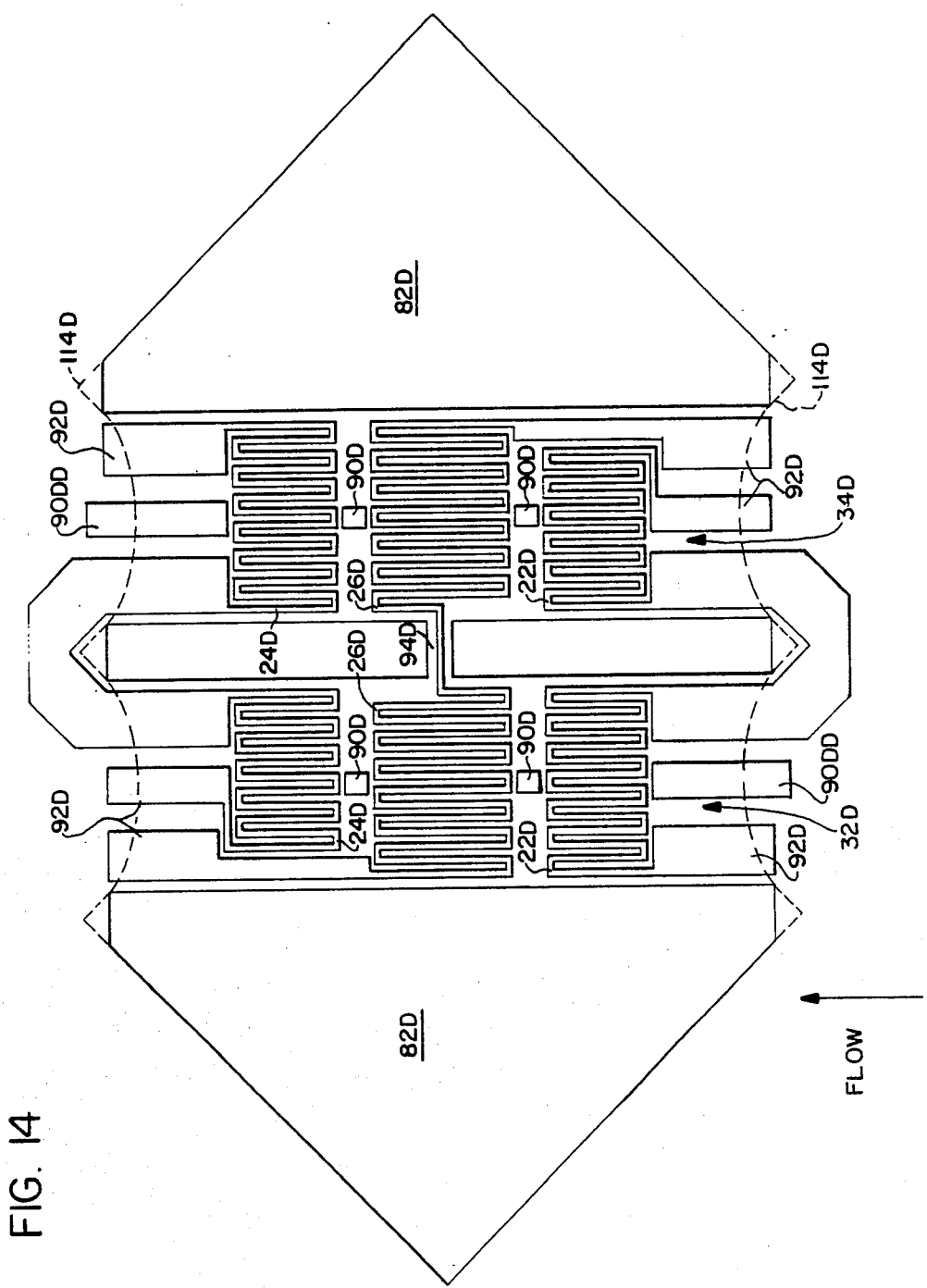

In the embodiment of FIG. 14, two members 32D and 34D, interconnected by an interconnect 94D, are bridged over the depression with half of each element (heater 26D and sensors 22D and 24D) being located on each member and being series connected. The permalloy grid patterns 22D, 24D and 26D, patches 90D and 90DD, and leads 92D have 180 degree rotational symmetry to assure a thermal balance of sensor elements 22D and 24D. Patches 90D are included to add strength along the center line of the members, patches 90DD also adding strength along the center line of the members and providing symmetrical heat conduction properties. In this embodiment, air flow is typically oriented along the length of the members, in contrast to the previously discussed embodiments in which air flow is typically oriented laterally to the members. Sensing elements 22D and 24D are relatively narrow, each half sensor being 75 microns in width and 135 microns in length. The distance between the edges of heater 26D and the near edges of sensors 22D and 24D is 0.001 inch (25 microns). Having half elements 22D, 24D and 26D on each member helps assure coplanarity. In the embodiment of FIG. 14, each member has a width of 0.006 inch and a length of 0.019 inch. The resistance of heater 26D is 1300 ohms, and the resistance of each sensor 22D and 24D is 1050 ohms. The sensor of this embodiment responds less to flow in contrast to the previously discussed embodiments because relatively little air flows beneath the members, and because the sensors are closer to the walls of the depression in the semiconductor body and, therefore, are more tightly coupled thermally to the semiconductor body.

Figure 15:
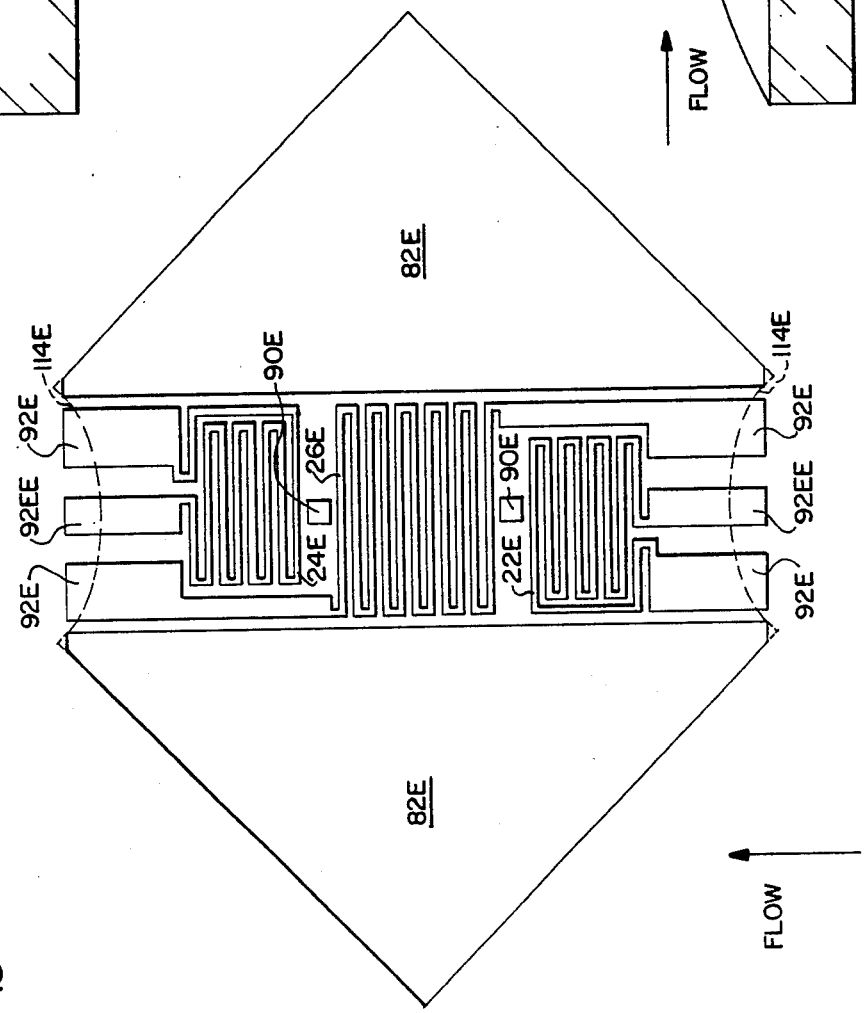

The embodiment of FIG. 15 employs a single member bridged over a depression such as 30 with flow typically being directed along the length of the member, which, in this embodiment, is approximately 0.006 inch wide and 0.019 inch long. In the embodiment shown, the resistance of heater element 26E is 710 ohms, and the resistance of each sensor element 22E and 24E is 440 ohms. Beyond the difference in lower resistance elements and having the elements located on a single bridge, this embodiment is otherwise substantially the same as the embodiment of FIG. 14, permalloy patches 90E and leads 92EE adding strength along the center line of the member, leads 92E and 92EE providing 180 degree thermal symmetry.

In the embodiments thus far described, the heater element and the two sensing elements were each separate electrical elements. By comparison, the flow sensors illustrated in FIGS. 16 and 17 comprise a singular resistive grid, which, as further explained below, functions as not only the heater but also as both sensors. Thus, the embodiment illustrated in FIG. 16 comprises an electrical resistive grid 26F having electrical end taps 98 and 100 for enabling a voltage to be measured across resistance sections at each end of the total resistance. Although taps 98 and 100 are shown tapping off four grid lines on each side of the 14 line grid, the taps could be located to tap off any number of grid lines desired. Further, spacing between the tapped portions and the untapped (central) portion could be varied from the one line width spacing shown.

As shown in the Figure, resistive element grid 26F occupies substantially the entire central area of member 32F. The grid lines of electrical resistive grid 26F are oriented parallel to the length of member 32F. The total resistance of element 26F is 1510 ohms; as shown, taps 98 and 100 enable measurement across resistance sections of 330 ohms at each end of the total resistance. Member 32F, which supports element 26F above a depression such as 30, is approximately 0.006 inch wide and 0.016 inch long in the embodiment illustrated. Permalloy areas 106 and 108 are electrically isolated and are used to reinforce member 32F.

Figure 17:
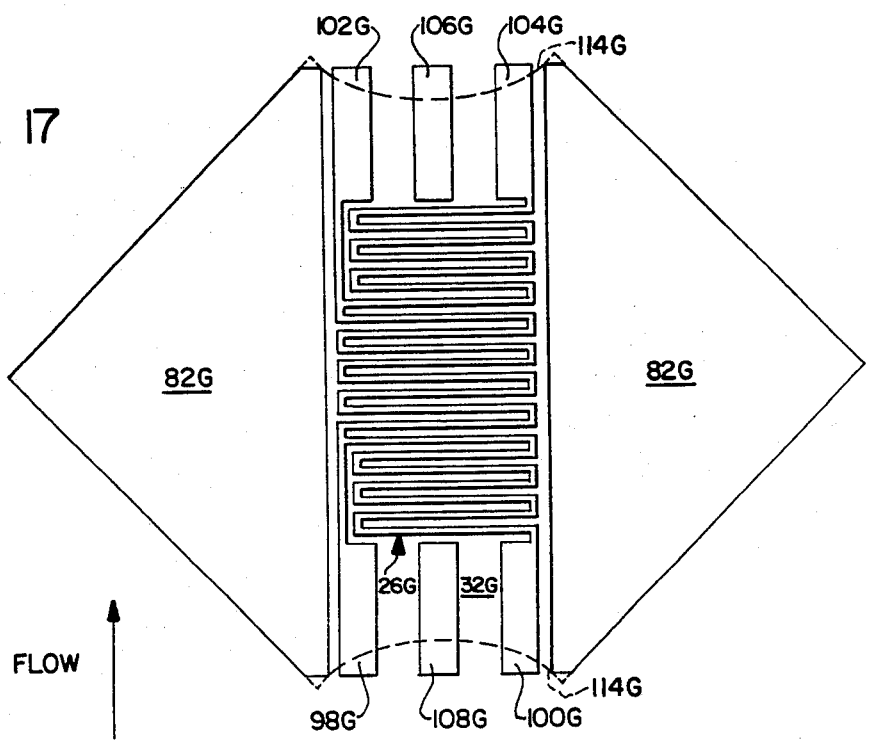

In the embodiments of FIGS. 14, 15, and 17, the heater and sensor elements are oriented along the length of the members, and flow is typically oriented parallel to the members as shown in the Figures. An advantage of such embodiments in that there is assurance of a continuous surface that will not cause minor turbulence in flow as is possible in configurations having flow typically oriented lateral to the members. As mentioned with regard to the embodiment of FIG. 14, a possible disadvantage of embodiments having flow typically oriented along the length of the members is that relatively little air flows under the members as compared to embodiments where flow is typically oriented laterally to the members.

The entire resistive grid element 26F may be self heated to a temperature of about 200 degrees Centigrade above ambient by connecting leads 102 and 104 to circuitry such as illustrated in FIG. 4. At such a temperature, the total resistance of element 26F would be approximately 2500 ohms. Air flow is typically directed laterally across member 32F, thus cooling the upstream side more than the downstream side. With no air flow, and assuming that the tapped sections are identical, their differential voltage is zero. With air flow, the tapped sections experience a temperature differential which will cause a temperature resistance differential and hence a voltage differential which is the measurable output of the device corresponding to the air flow velocity.

Figure 16:
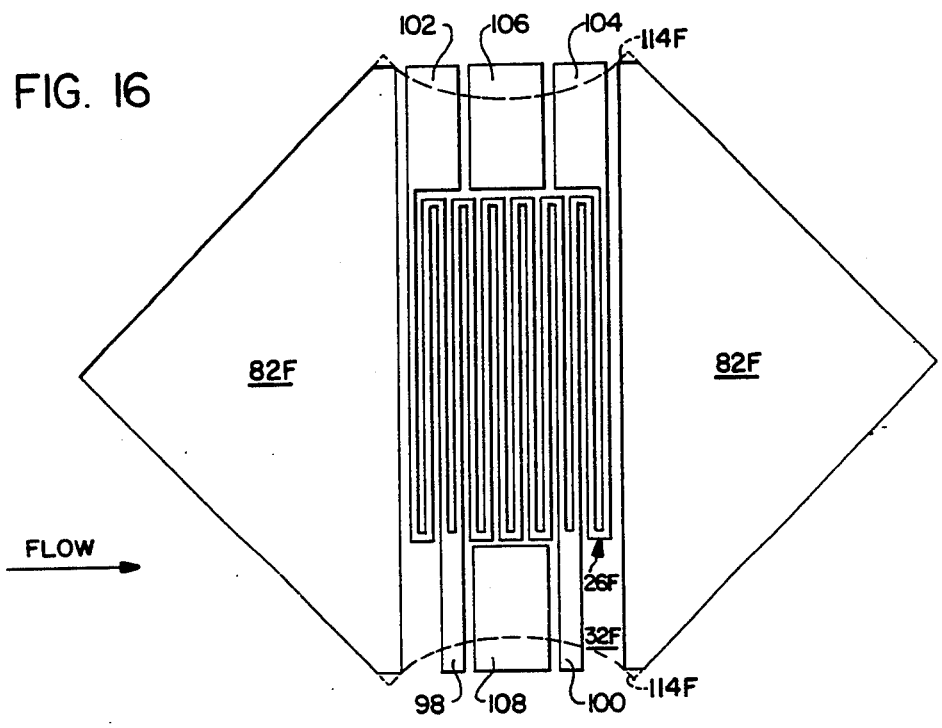

The embodiment shown in FIG. 17 is substantially identical to that in FIG. 16 except that in the embodiment of FIG. 17 the grid lines of resistive grid 26G are oriented perpendicular to the center line of member 32G, and air flow is typically oriented parallel to the center line of member 32G. In the embodiment of FIG. 17, the total resistance is 1420 ohms with the resistance sections tapped by taps 98G and 100G being 420 ohms at each end of the total resistance.

The total resistance of the resistive grid element in embodiments such as those in FIGS. 16 and 17 is typically within the range of approximately 500 ohms to approximately 2000 at approximately 25 degrees Centigrade. The resistance of the resistance sections at each end of the total resistance are typically within approximately 20 percent to approximately 40 percent of the total resistance of the resistive element. As with other typical parameters provided in this application, these parameters are illustrative only and are not intended to be limiting.

An alternate flow sensor scheme implements two self heatable resistive elements suspended in one or more members across a depression such as 30, with one element being downstream with respect to the other element and with each element being interchanged as a heater and a sensor. Thus, the upstream element may be self heated, e.g., to a specified constant temperature above ambient, while the temperature of the downstream element is sensed. The two elements then trade functions, such that the element whose temperature was previously sensed is now self heated, e.g., to a specified constant temperature above ambient, while the temperature of the other element is sensed. Each of the two elements then alternately switches from a self heating mode to a temperature sensing mode. When an element is in the temperature sensing mode, it is not appreciably self heated, but is heated by the other element that is in the self heating mode. When there is no flow across the elements, each element, when in the temperature sensing mode, will be heated almost identically, assuming that each element is heated to a common temperature when in the self heating mode. In this manner, the difference of the two pulsed temperature signals is substantially zero under no flow conditions. When there is flow across the elements, the downstream sensing element is heated more than the upstream sensing element, and there is a net difference in the temperature signals of the two elements, resulting in a flow velocity signal.

An alternate flow sensor scheme implements three elements suspended by one or more members across a depression such as 30, with the central element being self heated, and adjacent elements not appreciably self heated, the central element being self heated by current pulses with length and spacing typically being equal such that the self heated element temperature pulse increase and decrease approaches thermal equilibrium at the top and the bottom of the pulse. The sensor resistance elements receive corresponding heat pulses by thermal conduction through air which is influenced by air flow as previously described such that heat pulses cause corresponding heat pulses in the sensor elements. Although a circuit required to pulse the self heated element is more complex than would be required in a constant temperature (d.c.) self heated mode, advantages in some applications are obtained. For example, the air flow sensing output is, in effect, the difference of two a.c. pulses derived by subtracting the voltage pulses corresponding to the temperature pulses experienced by each sensor element. Such an a.c. output is convenient if voltage isolation is required between the flow sensor and a central control circuit. Another advantage is the reduction of errors in flow measurement caused by a fractional change of resistance of one sensor element relative to the other that might be caused, for example, by differential oxidation or contamination of the sensing elements. Such errors are not eliminated, but are reduced because, in taking the difference between the a.c. voltages across each sensor resistor element, the fractional change in sensor resistance caused by the oxidation or contamination effect is seen as a fractional change in the a.c. resistance pulse rather than a fractional change in the entire sensor resistance value. Therefore, the magnitude of the output voltage error is reduced approximately by a factor equal to the ratio of the sensor resistance value to the sensor resistance pulse value. This factor ranges from about 2 for the preferred embodiment of FIG. 9 to a factor of about 10 for other embodiments that have been evaluated and which give smaller temperature pulses. Although the pulsed mode may be desirable for some applications, it is not necessary or typically used in the preferred embodiment of the invention, since more complicated control circuitry is required. Pulsed operation was evaluated using a Hewlett Packard 3310 function generator to pulse the heater element. Such circuitry could be integrated onto a semiconductor body such as 20, e.g., at 116.

The preferred process of fabricating the present sensor comprises providing a (100) silicon wafer 20 having a surface 36 which receives a layer 29 of silicon nitride. Layer 29 is typically 4000 angstroms thick and is typically deposited by standard sputtering techniques in a low pressure gas discharge. Next, a uniform layer of permalloy, typically 80 percent nickel and 20 percent iron and 800 angstroms thick, is deposited on the silicon nitride by sputtering.

Using a suitable photo mask, a photo resist, and a suitable etchant, permalloy elements such as 22, 24, 26 and 38 are delineated.

A second layer 28 of silicon nitride, typically 4000 angstroms thick, is then sputter-deposited to provide complete step coverage of the permalloy configuration and thus protect the resistive element from oxidization.

Openings 82 (labeled 82A, 82C, 82D, etc. in alternate embodiments) are then etched through the nitride to the (100) silicon surface to deliniate each member such as 32 and 34. The relative sizes of openings 82 are largely a matter of design choice. Dotted lines 114 (labeled 114A, 114C, 114D, etc. in alternate embodiments) represent the approximate shape of depressions such as 30.

Finally, an anisotropic etchant that does not attack the silicon nitride is used to etch out the silicon in a controlled manner from beneath the members such as 32 and 34 (KOH plus isopropyl alcohol is a suitable etchant). The sloping sides of the etched depression such as 30 are bonded by (111) and other crystal surfaces that are resistive to the etchant, and the depression bottom, a (100) surface which is much less resistant to the etchant, is located a specified distance (e.g., 125 microns) from the members, typically by adjusting the duration of the etch. A doped silicon etch stop, e.g., a boron-doped layer, may also be used to control the depth of the depression, although such stops are not typically necessary when fabricating the present invention. By adjusting the duration of the etch, the depth of depressions such as 30 can be controlled to a precision of about three microns or to about two percent. This precision results in a precise reproducibility of the thermal conductance of the air space surrounding the members and a correspondingly precise reproducibility of air flow response.

In order to obtain efficient undercutting of cantilever members such as shown in FIG. 3A and in order to undercut bridged members of the type shown in FIG. 3, the predetermined configuration of the member, e.g., typically a straight edge such as 110 (FIG. 2), or an axis of the member, is oriented at a nonzero angle 112 to the [110] axis of the silicon (while the present invention will typically involve placing a straight member edge or an axis at an angle to the [110] silicon axis, it is conceivable that a member could be shaped such that no straight edges are involved or that no axis is easily defined, but that the configuration itself is still oriented to achieve the undercutting or to achieve it in a minimum time, as further discussed below).

By making angle 112 substantially 45 degrees, the member will be undercut in a minimum amount of time. Further, using a nonzero orientation permits fabrication of two ended bridges such as shown in FIG. 3. Such members are substantially impossible to make with the member edges oriented substantially with the [110] direction. This is because an anisotropic etch will not appreciably undercut at inside corners or at the (111) crystal planes exposed along the edges of the member if the edges of the members are oriented with the [110] direction.

Making angle 112 a 45 degree angle also permits rapid rounding and smoothing of the semiconductor end support interface with the member, thus avoiding a stress concentration point that otherwise occurs where two (111) planes intersect below dielectric layer 29.

As previously indicated, it may be desirable in some device applications to connect two members by a connecting means (see, for example, interconnects 94 in FIG. 10 and interconnect 94D in FIG. 14). Thus, as in FIG. 10, connecting means 94 help to maintain uniformity of spacing and, therefore, thermal conductance between each member and the bottom of a depression such as 30, thus contributing to the uniformity of performance within a device. For similar reasons, as also previously indicated, it may be of advantage to place more than one element, or one element and part of another element, on a single member (see, for example, FIGS. 1, 2, 9, 10, 11, 12, 14, and 15).

As shown in FIG. 9, small rectangular etch holes 82, shown at both ends of bridge type members 32 and 34, may be included in order to provide further undercutting and forming of semiconductor body 20 where members 32 and 34 are attached. However, such small rectangular holes 82 at the ends of the members are not necessary for satisfactory performance of the devices.

FIGS. 3 and 3A also show a region 116 for integration of circuitry such as that illustrated in FIGS. 4 and 5.

For the embodiments shown, typical dimensions of members such as 32 or 34 are 0.005 inch–0.007 inch wide, 0.010–0.020 inch long, and 0.8–1.2 microns thick. Typical permalloy elements such as elements 22, 24, 26, and 38 have a thickness of approximately 800 angstroms (typically in the range of approximately 800 angstroms to approximately 1600 angstroms) with a preferred composition of 80 percent nickel and 20 percent iron and a resistance value within the range of approximately 200 ohms to at approximately 2000 ohms at room temperature, e.g., at approximately 20–25 degrees Centigrade (at permalloy element temperatures up to approximately 400 degrees Centigrade, resistance values increase by a factor of up to approximately three). Line widths within permalloy grids may be approximately 5 microns with a 5 micron spacing. Depressions such as 30 typically have a 0.005 inch (125 micron) spacing between members such as 32 and 34 and the semiconductor body such as 20, but the spacing can easily vary in the range of approximately 0.001 inch to approximately 0.010 inch. A typical thickness of a semiconductor body or substrate such as 20 is 0.008 inch. (The dimensions provided are illustrative only and are not to be taken as limitations.)

Members of the typical dimensions indicated have a very small thermal heat capacity. Because of the exceedingly small thermal mass of the members and the heater and sensor elements, and because of the thermal insulation provided within the members by the thin dielectric means for connecting the elements to the supporting body, and because of the air space surrounding the members, response time is very short, with response time constants of 0.005 second having been measured. Consequently, the sensor elements can respond very rapidly to air flow changes, and the heater can be pulsed or operated at frequencies of up to and beyond 50 Hz as desired.

Typical operating temperatures of heater elements such as 26 are in the range of approximately 100 to 400 degrees Centigrade with approximately 200 degrees Centigrade above ambient being the preferred operating temperature. Using the preferred permalloy element, this can be accomplished with only a few milliwats of input power. Such power levels are compatible with integrated electronics which, as previously indicated, can be fabricated on the same semiconductor body with the sensor if desired.

A heater resistance element having a 600 to 1000 ohm preferred resistance at 25 degrees Centigrade provides the desired power dissipation to achieve the preferred operating temperature at a convenient voltage of a few volts and a convenient current of, for example, 2 to 3 milliamperes. Element failure by electromigration is also a factor in choosing a typical impedance in the 600 to 1000 ohm range for permalloy heater elements used in the preferred embodiment. Electromigration is a temperature-dependent failure mechanism within a conductor caused by mass flow when current densities exceed a critical limit, on the order of 10 million amperes per square centimeter at 25 degrees Centigrade in permalloy. In the preferred embodiment, in which the heater resistance is typically 600 to 1000 ohms, resistance line widths are 5 microns, and resistance element thickness is 0.08 microns, the current density is substantially less, approximately 0.6 million amperes per square centimeter. At these current levels, electromigration has not been found to be a detrimental factor.

A standard temperature sensor in the industry has an electrical impedance of 100 ohms. However, for the purpose of the present invention, such a low sensor resistance is less desirable than the higher 600 to 1000 ohm preferred sensor element resistance at 25 degrees Centigrade obtained with the approximately 0.08 micron thickness in the preferred embodiments of the present invention. For example, in processing, it is desirable to obtain a match between the upstream and downstream sensor elements to a precision of about 0.1 percent. This match is easier to determine using the higher preferred sensor resistance values. Moreover, the higher preferred sensor element resistance reduces the unfavorable effect of differences in lead resistance associated with lead configuration on the silicon sensor chip. Further, a smaller current through the higher preferred sensor resistance is required to obtain convenient and precise changes in voltage for small changes in air flow. In addition, small sensor currents avoid substantial self heating of the sensor resistor elements. This is not a severe effect, although self heating modifies the temperature field of the heater resistance element and tends to reduce the temperature sensitivity to air flow in the preferred embodiments. In addition, higher sensor element currents magnify the undesirable effects of any residual no-flow mismatch between sensor resistance elements.

For processing purposes it is simpler and more economical to choose the same thickness of permalloy for both heater and sensor resistance elements. This choice is supported by the preferred heater and sensor resistance values which, as discussed above, are typically of similar values and readily obtainable with the preferred permalloy thickness of 0.08 microns.

As has been indicated, for many contemplated applications, the preferred elements in the present invention are the preferred permalloy resistive elements previously described. When laminated within a silicon nitride member such as 32 or 34, the permalloy element is protected from oxidation by air and can be used as a heating element to temperatures in excess of 400 degrees Centigrade. Such a permalloy element has a resistance versus temperature characteristic similar to that of bulk platinum, both permalloy and platinum having a thermal coefficient of resistance (TCR) of about 4000 parts per million at zero degrees Centigrade. However, permalloy has been found superior to platinum for structures in accordance with the present invention. Although platinum is a commonly used material for temperature sensitive resistors, permalloy has the advantage of a resistivity of about twice that of platinum. Further, in thin films, permalloy achieves maximum TCR in the thickness range of about 800 to 1600 angstroms, whereas platinum films must be at least 3500 angstroms thick (permalloy achieves its maximum TCR at a thickness of about 1600 angstroms, but 800 angstroms has been selected as a preferred thickness since resistivity is doubled and the TCR is only slightly less than at 1600 angstroms). Consequently, using a permalloy element 800 angstroms in thickness, the same resistance requires only one-eighth the surface area that would be required for platinum, thus increasing the thermal efficiency of the heating and sensing elements, reducing required surface area, and lowering unit costs.

Thus, the permalloy elements in the present sensors are both an efficient heater element and an efficient sensing element for temperature changes of microstructures such as those disclosed.

Further, a permalloy heater/sensor laminated into a supporting insulating film of silicon nitride typically on the order of one micron thick provides passivation against oxygen, particularly at elevated temperatures, for the permalloy film. The silicon nitride film also provides thermal isolation of the permalloy films from the semiconductor body. The silicon nitride also permits precision control of the dimensions of members such as 32 and 34 because of the high resistance to process etching possessed by the silicon nitride. In addition, because of the high resistance to process etching possessed by the silicon nitride, it permits deep etching to yield depressions such as 30 of dimensions such as 0.001 inch to 0.010 inch for control of the principal thermal conductance factor.

Accordingly, using preferred embodiments of the present invention, permalloy forms both a temperature sensor and heater/radiation source in combination with the microstructure disclosed. Use of silicon nitride as a supporting and passivating material permits etching times that are needed to achieve the desired structure. In addition, orientation of the members, as previously described, provides undercutting in a minimum amount of time and achieves the desired structure without artificial etch stops. In addition, the use of deep anisotropic etching to control depression depth to the 0.001 to 0.010 inch range achieves greater thermal isolation than is possible using conventional emplacements of resistive elements in integrated semiconductor devices.

The present invention is to be limited only in accordance with the scope of the appended claims, since persons skilled in the art may devise other embodiments still within the limits of the claims. For example, the present invention is not limited to having a permalloy resistive element, since any suitable heater or sensing element would suffice. Alternate examples of elements include a pyroelectric material such as a zinc oxide monocrystalline film, a thin film thermocouple junction, a thermistor film of semiconducting material, or a metallic film other than permalloy with a favorable temperature coefficient of resistance (TCR). Note also that, while "air" is sometimes mentioned as the medium in which flow is being monitored, the present sensors are applicable to many other gaseous substances in addition. Therefore, for the purposes of the present application, "air" is defined to include gaseous substances in general.

The embodiments of the invention in which an exclusive property or right is claimed are defined as follows:

1. A flow sensor, comprising:
   a thin film heater suspended in air;
   a pair of thin film heat sensors suspended in air and disposed on opposite sides of the heater;
   and
   means for operating the thin film heater at a constant temperature above ambient temperature under both flow and no-flow conditions.

2. A flow sensor, comprising:
   a thin film heater;
   a pair of thin film heat sensors;
   a semiconductor body supporting the heater and sensors with at least a major portion of the heater and sensors out of contact with the body and with the sensors disposed on opposite sides of the heater;
   and
   means for operating the thin film heater at a constant temperature above ambient under both flow and no-flow conditions.

3. A flow sensor, comprising:
   a thin film heater;
   a pair of thin film sensors;
   a semiconductor body with a depression therein;
   means connecting the heater and the sensors to the body and bridging the depression so that at least a major portion of the heater and the sensors are out of contact with the body and with the sensors disposed on opposite sides of the heater;
   and
   means for operating the thin film heater at a constant temperature above ambient temperature under both flow and no-flow conditions.

4. The apparatus of claim 1, 2, or 3 wherein the constant temperature above ambient temperature creates a no-flow temperature gradient in the air above and adjacent to the heater, the temperature within the no-flow gradient making a transition between the elevated temperature and substantially ambient temperature, the sensors being located sufficiently close to the heater to be located substantially within the no-flow temperature gradient.

5. The apparatus of claim 1, 2, or 3 wherein the sensors are located from the heater at a preferred distance which, when contrasted to an alternate distance, provides a substantially greater change in the heat being delivered to the sensors for a given change in flow rate.

6. The apparatus of claim 1, 2, or 3 wherein the proximal edges of the sensors are located from the near edges of the heater at a distance within the range of approximately 5 microns to approximately 25 microns.

7. The apparatus of claim 1, 2, or 3 wherein the heater and each sensor comprise a resistive element having a pattern of resistive material formed in lines having a line width, the lines being separated by substantially a line width, the sensors being separated from the heater by a distance in the range of approximately one line width to approximately five line widths.

8. The apparatus of claim 1, 2, or 3 wherein the thin film heater and sensors each comprise a permalloy element.

9. The apparatus of claim 8 wherein each permalloy element has a resistance in the range of approximately 200 ohms to approximately 2000 ohms at approximately 25 degrees Centigrade.

10. The apparatus of claim 3 wherein the means connecting the heater and the sensors to the body comprises a dielectric encapsulating the heater and the sensors.

11. The apparatus of claim 10 wherein the dielectric has a thickness in the range of approximately 0.8 micron to approximately 1.2 microns.

12. The apparatus of claim 10 wherein the dielectric comprises silicon nitride.

13. The apparatus of claim 3 wherein:
   the semiconductor body comprises (100) silicon having a (100) plane and a [110] direction;
   the heater and sensors lie in a plane substantially parallel to the (100) plane; and
   the means connecting the heater and sensors to the body have a configuration oriented at a non-zero angle to the [110] direction.

14. The apparatus of claim 13 wherein the non-zero angle is substantially 45 degrees.

15. A flow sensor comprising:
   a thin film heater encapsulated in thin film dielectric;
   a pair of thin film sensors encapsulated in thin film dielectric, the sensors being disposed on opposite sides of the heater;

a semiconductor body with a depression therein;

the encapsulated heater and sensors forming at least one thin film member bridged across the depression so that at least a major portion of the heater and the sensors are out of contact with the semiconductor body; and means for operating the thin film heater at a constant temperature above ambient temperature under both flow and no-flow conditions.

16. A flow sensor comprising:

a semiconductor body having a depression formed into a first surface of the body;

a thin film heater encapsulated in thin film dielectric;

a pair of thin film sensors encapsulated in thin film dielectric, the thin film sensors being disposed on opposite sides of the heater;

the encapsulated heater and sensors forming at least one thin film member, the at least one thin film member being attached to the first surface at least at one location in order to suspend at least a major portion of the heater and sensors over the depression; and means for operating the thin film heater at a constant temperature above ambient temperatures under both flow and no-flow conditions.

17. The apparatus of claim 15 or 16 wherein the constant temperature above ambient temperature creates a no-flow temperature gradient in the air above and adjacent to the heater, the temperature within the no-flow gradient making a transition between the elevated temperature and substantially ambient temperature, the sensors being located sufficiently close to the heater to be located substantially within the no-flow temperature gradient.

18. The apparatus of claim 15 or 16 wherein the sensors are located from the heater at a preferred distance which, when contrasted to an alternate distance, provides a substantially greater change in the heat being delivered to the sensors for a given change in flow rate.

19. The apparatus of claim 15 or 16 wherein the proximal edges of the sensors are located from the near edges of the heater at a distance within the range of approximately 5 microns to approximately 25 microns.

20. The apparatus of claim 15 or 16 wherein the heater and each sensor comprise a resistive element having a pattern of resistive material formed in lines having a line width, the lines being separated by substantially a line width, the sensors being separated from the heater by a distance in the range of approximately one line width to approximately five line widths.

21. The apparatus of claim 15 or 16 wherein the thin film heater and sensors each comprise a permalloy element.

22. The apparatus of claim 21 wherein each permalloy element has a resistance in the range of approximately 200 ohms to approximately 2000 ohms at approximately 25 degrees Centigrade.

23. The apparatus of claim 15 or 16 wherein the dielectric has a thickness in the range of approximately 0.8 micron to approximately 1.2 microns.

24. The apparatus of claim 23 wherein the dielectric comprises silicon nitride.

25. The apparatus of claim 15 or 16 wherein the semiconductor body comprises:

an element for sensing the ambient temperature; and a circuit for maintaining the temperature of the heater at a constant value above ambient temperature during both flow and no-flow conditions.

26. The apparatus of claim 15 or 16 wherein:

the semiconductor body comprises (100) silicon having a (100) plane and a [110] direction;

the heater and sensors lie in a plane substantially parallel to the (100) plane; and the means connecting the heater and sensors to the body have a configuration oriented at a non-zero angle to the [110] direction.

27. A flow sensor, comprising:

a thin film heater;

a pair of thin film sensors;

a semiconductor body with a depression therein; and means connecting the heater and the sensors to the body and bridging the depression so that a least a major portion of the heater and the sensors are out of contact with the body and with the sensors disposed on opposite sides of the heater, a portion of the depression being devoid of a side wall.

28. The apparatus of claim 27 wherein an upstream portion of the depression is open to receive flow unimpeded by a side wall.

29. The apparatus of claim 27 or 28 wherein the heater is operated at a temperature elevated above ambient, thus creating a no-flow temperature gradient in the air above and adjacent to the heater, the temperature within the no-flow gradient making a transition between the elevated temperature and substantially ambient temperature, the sensors being located sufficiently close to the heater to be located substantially within the no-flow temperature gradient.

30. The apparatus of claim 27 or 28 wherein the sensors are located from the heater at a preferred distance which, when contrasted to an alternate distance, provides a substantially greater change in the heat being delivered to the sensors for a given change in flow rate.

31. The apparatus of claim 27 or 28 wherein the proximal edges of the sensors are located from the near edges of the heater at a distance within the range of approximately 5 microns to approximately 25 microns.

32. The apparatus of claim 27 or 28 wherein the heater and each sensor comprise a resistive element having a pattern of resistive material formed in lines having a line width, the lines being separated by substantially a line width, the sensors being separated from the heater by a distance in the range of approximately one line width to approximately five line widths.

33. The apparatus of claim 27 or 28 wherein the thin film heater and sensors each comprise a permalloy element.

34. The apparatus of claim 33 wherein each permalloy element has a resistance in the range of approximately 200 ohms to approximately 2000 ohms at approximately 25 degrees Centigrade.

35. The apparatus of claim 27 or 28 wherein the means connecting the heater and the sensors to the base comprise a dielectric encapsulating the heater and the sensors.

36. The apparatus of claim 35 wherein the dielectric has a thickness in the range of approximately 0.8 micron to approximately 1.2 microns.

37. The apparatus of claim 35 wherein the dielectric comprises silicon nitride.

38. The apparatus of claim 27 or 28 wherein:

the semiconductor body comprises (100) silicon having a (100) plane and a [110] direction;

the heater and sensors lie in a plane substantially parallel to the (100) plane; and the means connecting the heater and sensors to the body have a configuration oriented at a non-zero angle to the [110] direction.

39. The apparatus of claim 38 wherein the non-zero angle is substantially 45 degrees.

40. A flow sensor comprising:

a thin film heater encapsulated in thin film dielectric;

a pair of thin film sensors encapsulated in thin film dielectric, the sensors being disposed on opposite sides of the heater;

a semiconductor body with a depression therein; and the encapsulated heater and sensors forming at least one thin film member bridged across the depression so that at least a major portion of the heater and the sensors are out of contact with the semiconductor body;

a portion of the depression being devoid of a side wall.

41. The apparatus of claim 40 wherein an upstream portion of the depression is open to receive flow unimpeded by a side wall.

42. The apparatus of claim 40 or 41 wherein the heater is operated at a temperature elevated above ambient, thus creating a no-flow temperature gradient in the air above and adjacent to the heater, the temperature within the no-flow gradient making a transition between the elevated temperature and substantially ambient temperature, the sensors being located sufficiently close to the heater to be located substantially within the no-flow temperature gradient.

43. The apparatus of claim 40 or 41 wherein the sensors are located from the heater at a preferred distance which, when contrasted to an alternate distance, provides a substantially greater change in the heat being delivered to the sensors for a given change in flow rate.

44. The apparatus of claim 40 or 41 wherein the heater and each sensor comprise a resistive element having a pattern of resistive material formed in lines having a line width, the lines being separated by substantially a line width, the sensors being separated from the heater by a distance in the range of approximately one line width to approximately five line widths.

45. The apparatus of claim 40 or 41 wherein the thin film heater and sensors each comprise a permalloy element.

46. The apparatus of claim 45 wherein each permalloy element has a reference in the range of approximately 200 ohms to approximately 2000 ohms at approximately 25 degrees Centigrade.

47. The apparatus of claim 40 or 41 wherein the dielectric has a thickness in the range of approximately 0.8 micron to approximately 1.2 microns.

48. The apparatus of claim 47 wherein the dielectric comprises silicon nitride.

49. The apparatus of claim 40 or 41 wherein the semiconductor body comprises:

an element for sensing the ambient temperature; and a circuit for maintaining the temperature of the heater at a constant value above ambient temperature during both flow and no-flow conditions.

50. The apparatus of claim 40 or 41 wherein:

the semiconductor body comprises (100) silicon having a (100) plane and a [110] direction;

the heater and sensors lie in a plane substantially parallel to the (100) plane; and the means connecting the heater and sensors to the body have a configuration oriented at a non-zero angle to the [110] direction.

51. The apparatus of claim 50 wherein the non-zero angle is substantially 45 degrees.

52. A flow sensor comprising:

a semiconductor body having a depression formed into a first surface of the body;

a thin film heater encapsulated in thin film dielectric; and a pair of thin film sensors encapsulated in thin film dielectric, the thin film sensors being disposed on opposite sides of the heater;

the encapsulated heater and sensors forming at least one thin film member, the at least one thin film member being attached to the first surface at least at one location in order to suspend at least a major portion of the heater and sensors over the depression, a portion of the depression being devoid of a side wall.

53. The apparatus of claim 52 wherein an upstream portion of the depression is open to receive flow unimpeded by a side wall.

54. The apparatus of claim 52 or 53 wherein the heater is operated at a temperature elevated above ambient, thus creating a no-flow temperature gradient in the air above and adjacent to the heater, the temperature within the no-flow gradient making a transition between the elevated temperature and substantially ambient temperature, the sensors being located sufficiently close to the heater to be located substantially within the no-flow temperature gradient.

55. The apparatus of claim 52 or 53 wherein the sensors are located from the heater at a preferred distance which, when contrasted to an alternate distance, provides a substantially greater change in the heat being delivered to the sensors for a given change in flow rate.

56. The apparatus of claim 52 or 53 wherein the proximal edges of the sensors are located from the near edges of the heater at a distance within the range of approximately 5 microns to approximately 25 microns.

57. The apparatus of claim 52 or 53 wherein the heater and each sensor comprise a resistive element having a pattern of resistive material formed in lines having a line width, the lines being separated by substantially a line width, the sensors being separated from the heater by a distance in the range of approximately one line width to approximately five line widths.

58. The apparatus of claim 52 or 53 wherein the thin film heater and sensor each comprise a permalloy element.

59. The apparatus of claim 58 wherein each permalloy element has a resistance in the range of approximately 200 ohms to approximately 2000 ohms at approximately 25 degrees Centigrade.

60. The apparatus of claim 52 or 53 wherein the dielectric has a thickness in the range of approximately 0.8 micron to approximately 1.2 microns.

61. The apparatus of claim 60 wherein the dielectric comprises silicon nitride.

62. The apparatus of claim 52 or 53 wherein the semiconductor body comprises:

an element for sensing the ambient temperature; and a circuit for maintaining the temperature of the heater at a constant value above ambient temperature during both flow and no-flow conditions.

63. The apparatus of claim 52 or 53 wherein:
the semiconductor body comprises (100) silicon having a (100) plane and a [110] direction;
the heater and sensors lie in a plane substantially parallel to the (100) plane; and
the means connecting the heater and sensors to the body have a configuration oriented at a non-zero angle to the [110] direction.

64. The apparatus of claim 63 wherein the non-zero angle is substantially 45 degrees.

65. The apparatus of claim 8 wherein each permalloy element has a thickness in the range of approximately 800 angstroms to approximately 1600 angstroms.

66. The apparatus of claim 21 wherein each permalloy element has a thickness in the range of approximately 800 angstroms to approximately 1600 angstroms.

67. The apparatus of claim 45 wherein each permalloy element has a thickness in the range of approximately 800 angstroms to approximately 1600 angstroms.

68. The apparatus of claim 40 or 41 wherein the proximal edges of the sensors are located from the near edges of the heater at a distance within the range of approximately 5 microns to approximately 25 microns.

* * * * *